United States Patent
Akiyama et al.

(10) Patent No.: US 9,380,657 B2
(45) Date of Patent: Jun. 28, 2016

(54) LED LIGHTING DEVICE

(71) Applicants: CITIZEN HOLDINGS CO., LTD., Tokyo (JP); CITIZEN ELECTRONICS CO., LTD., Yamanashi (JP)

(72) Inventors: Takashi Akiyama, Saitama (JP); Rintaro Takahashi, Saitama (JP); Keisuke Sakai, Chiba (JP)

(73) Assignees: CITIZEN HOLDINGS CO., LTD., Tokyo (JP); CITIZEN ELECTRONICS CO., LTD., Yamanashi (JP)

( * ) Notice: Subject to any disclaimer, the term of this patent is extended or adjusted under 35 U.S.C. 154(b) by 30 days.

(21) Appl. No.: 14/347,736

(22) PCT Filed: Oct. 4, 2012

(86) PCT No.: PCT/JP2012/075828
§ 371 (c)(1),
(2) Date: Jul. 7, 2014

(87) PCT Pub. No.: WO2013/051658
PCT Pub. Date: Apr. 11, 2013

(65) Prior Publication Data
US 2014/0361695 A1    Dec. 11, 2014

(30) Foreign Application Priority Data

Oct. 4, 2011   (JP) .................................. 2011-219997
Mar. 29, 2012  (JP) .................................. 2012-076701

(51) Int. Cl.
*H05B 37/02*   (2006.01)
*H05B 33/08*   (2006.01)

(52) U.S. Cl.
CPC .......... *H05B 33/0815* (2013.01); *H05B 33/083* (2013.01); *H05B 33/0812* (2013.01); *H05B 33/0845* (2013.01); *Y02B 20/343* (2013.01); *Y02B 20/345* (2013.01)

(58) Field of Classification Search
CPC .......... H05B 33/0812; H05B 33/0815; H05B 33/083; H05B 33/0845; Y02B 20/345
See application file for complete search history.

(56) References Cited

U.S. PATENT DOCUMENTS 5,959,413 A  *  9/1999  Komarek .............. H04M 1/723
                                           315/169.3
6,989,807 B2 *  1/2006  Chiang ................ H05B 33/083
                                           315/291

(Continued)

FOREIGN PATENT DOCUMENTS

JP     H04-115799 U    10/1992
JP     2002-190392 A    7/2002

(Continued)

OTHER PUBLICATIONS

International Written Opinion for PCT/JP2012/075828, Dec. 25, 2012.

(Continued)

*Primary Examiner* — Jason M Crawford
*Assistant Examiner* — Kurtis R Bahr

(57) ABSTRACT

The purpose of the invention is to obtain, with a simple circuit configuration, an LED illumination device having an LED column driven by a pulsating voltage, capable of lighting with little flicker, and also having lighting control capability. The LED illumination device (400) comprises: an LED column (210) including a plurality of LEDs (211) connected in series; a rectifier (460) receiving an AC power supply (202) and outputting a pulsating voltage to the LED column (210); a current limit circuit (420) connected to the LED column (210) in series and having resistor elements (424 to 426); and a control circuit (250) for controlling the current flowing through the LED column (210) by controlling the resistor elements (424 to 426) and thereby controlling the lighting of the LED column (210).

12 Claims, 11 Drawing Sheets

(56) References Cited

U.S. PATENT DOCUMENTS

| | | | |
|---|---|---|---|
| 8,044,608 B2 * | 10/2011 | Kuo | H05B 33/0815 315/291 |
| 8,324,840 B2 * | 12/2012 | Shteynberg | H05B 33/083 315/185 R |
| 8,471,495 B2 * | 6/2013 | Muguruma | H05B 33/083 315/185 R |
| 2008/0191642 A1 * | 8/2008 | Slot | H05B 33/0818 315/295 |
| 2009/0212721 A1 | 8/2009 | Maruyama | |
| 2010/0134018 A1 | 6/2010 | Tziony et al. | |
| 2010/0295458 A1 * | 11/2010 | Cheng | H05B 33/0809 315/185 R |
| 2011/0084618 A1 * | 4/2011 | Kang | H05B 33/0809 315/185 R |
| 2011/0109249 A1 | 5/2011 | Liu et al. | |
| 2011/0227489 A1 * | 9/2011 | Huynh | H05B 33/083 315/185 R |
| 2012/0256550 A1 * | 10/2012 | Akiyama | H05B 33/0824 315/187 |
| 2012/0313541 A1 * | 12/2012 | Egawa | H05B 33/0827 315/201 |
| 2013/0234609 A1 * | 9/2013 | Akiyama | H05B 33/0821 315/185 R |

FOREIGN PATENT DOCUMENTS

| | | | |
|---|---|---|---|
| JP | 2002190392 A | * | 7/2002 |
| JP | 2005-524960 A | | 8/2005 |
| JP | 2007-123562 A | | 5/2007 |
| JP | 2008-85324 A | | 4/2008 |
| JP | 2009-123427 A | | 6/2009 |
| JP | 2009-200257 A | | 9/2009 |
| JP | 2011-103285 A | | 5/2011 |
| KR | 10-2011-0034859 | * | 4/2011 |
| WO | 03/096761 A1 | | 11/2003 |
| WO | 2011/020007 A1 | | 2/2011 |
| WO | WO 2011105630 A1 | * | 9/2011 |

OTHER PUBLICATIONS

International Search Report for PCT/JP2012/075828, Dec. 25, 2012.
European Patent Office, Extended European Search Report for EP Patent Application No. 12838440.1, Aug. 6, 2015.

* cited by examiner

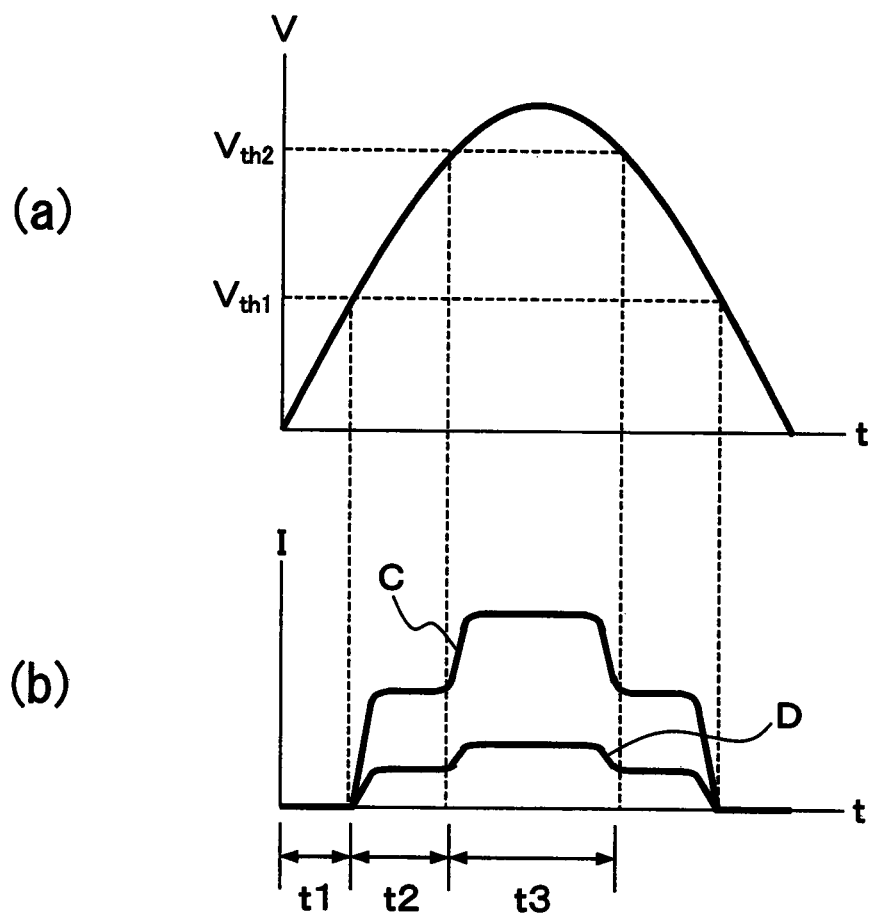

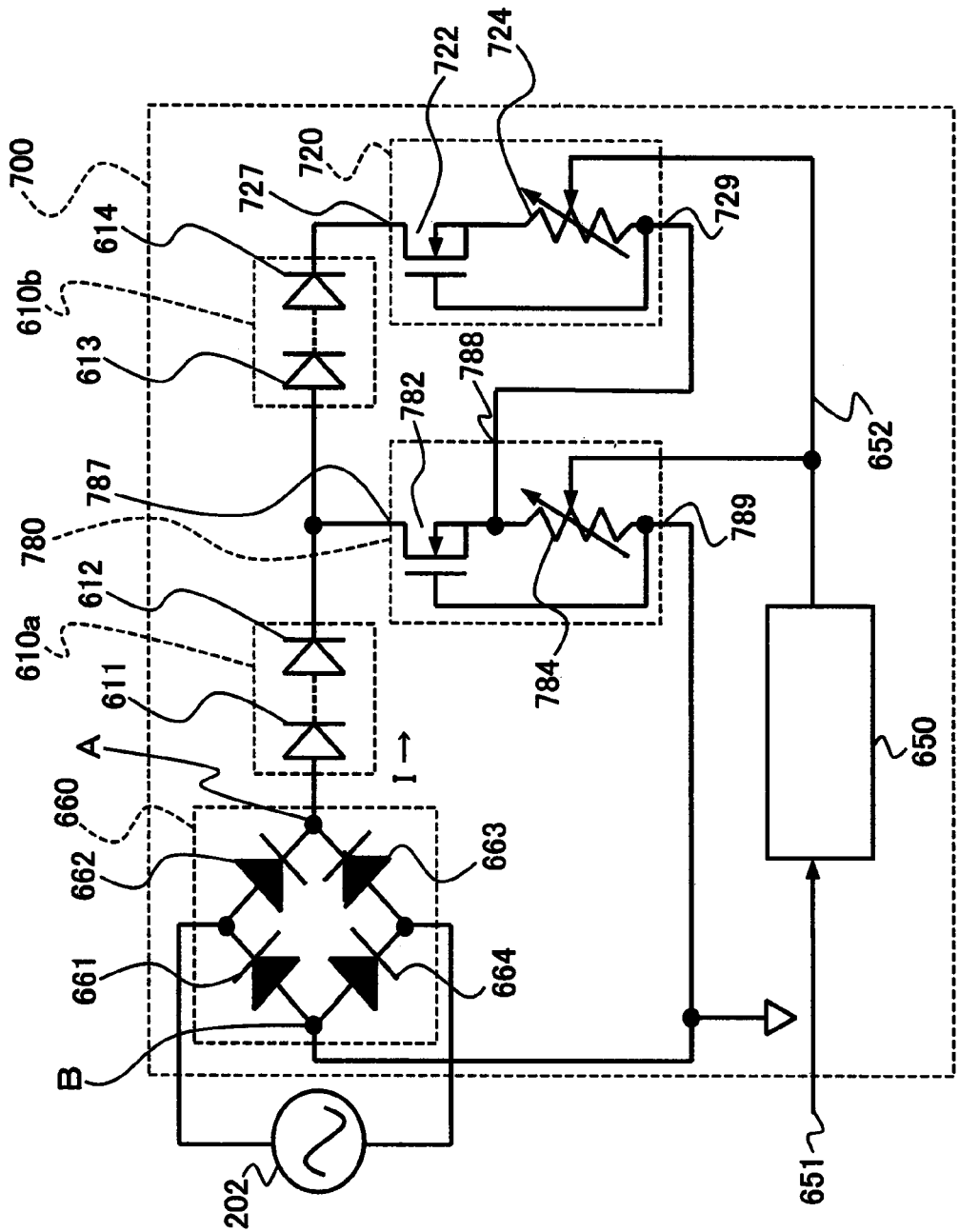

LED LIGHTING DEVICE

TECHNICAL FIELD

The present invention relates to an LED (Light Emitting Diode) lighting device. In more detail, the present invention relates to an LED lighting device that performs light control of an LED string by controlling a resistor element included in a circuit configured to limit a current flowing through the LED string driven by an undulating voltage to control the current flowing through the LED string.

BACKGROUND

In recent years, as a lighting lamp, an LED lighting device that uses an LED as a light source has come into widespread use. Until now, in the case where the LED is used for a purpose other than a lighting lamp, it is common to light the LED by a DC power source, and light control of the LED is performed by digital signal processing, for example, by changing the duty ratio or the number of pulses.

However, the LED lighting device is supposed to be used as a replacement of an incandescent bulb or a fluorescent lamp, and therefore it is desirable to enable lighting by utilizing the commercial alternating-current power source. Further, it is desired for the LED lighting device using the LED to have the light control function.

There is known an LED lighting device that lights the LED by directly applying a full-wave rectified waveform obtained from the commercial alternating-current power source to the LED string. The LED string is formed by connecting a plurality of LEDs in series and designed so as to be capable of resisting a high voltage. Compared to the LED lighting device adopting another system in which the LED is lit by generating a fixed voltage from the commercial alternating-current power source, the LED lighting device in which the full-wave rectified waveform is applied directly to the LED string is characterized in that the circuit configuration is simple and compact.

However, if an undulating voltage is applied to the LED string, the LED lights up only for the period of time during which the undulating voltage exceeds a threshold value of the LED string. For example, in the case where a forward voltage Vf of the LED is 3 V and 40 LEDs are connected in series in the LED string, the threshold value of the LED string will be 120 V. Consequently, when the effective value of the commercial alternating-current power source is 100 V, in the LED lighting device, the LED lights up only for a short period of time during which the undulating voltage exceeds 120 V. Thus, if the undulating voltage is applied to the LED string, the power factor and the distortion factor deteriorate, as well as the LED lighting device becoming dark and flicker becoming conspicuous.

In order to address this, as a method for lengthening the lighting period, there is known a method in which the LED string is divided into a plurality of LED strings and in the phase in which the voltage of the undulating voltage is low, only part of the LED strings is lit, and in the phase in which the voltage of the undulating voltage is high, the number of LED strings to be lit is increased. The number of LED strings to be lit is adjusted by a bypass circuit connected to a connection point of the LED strings. The bypass circuit is turned on (brought into conduction) in the low voltage phase of the undulating voltage and turned off (brought out of conduction) in the high voltage phase of the undulating voltage. Turning on/off of the bypass circuit is controlled in accordance with the voltage of the undulating voltage or the current value of a current flowing through the LED string.

FIG. 26 of Patent Document 1 is illustrated in FIG. 1 as an example of the LED lighting device that controls the bypass circuit in accordance with the current value of a current flowing through the LED string.

In FIG. 1, FIG. 26 of Patent Document 1 is redrawn so as not to deviate from the gist of FIG. 26. As illustrated in FIG. 1, the LED lighting device 900 has the bridge rectifier 905, the first and second LED strings 910 and 930, the bypass circuit 920, and the current limit resistor 933. The commercial alternating-current power source 906 is connected to the input terminal of the bridge rectifier 905.

The bridge rectifier 905 has the four diodes 901, 902, 903, and 904, and the terminal A is the output terminal of the full-wave rectified waveform and the terminal B is the terminal from which the reference voltage is given. Within the first LED string 910, a large number of LEDs including the LEDs 911 and 912 are connected in series and within the second LED string 930, a large number of LEDs including the LEDs 931 and 932 are connected in series. The bypass circuit 920 has the pull-up resistor 921, the bypass resistor 924, the field effect transistor 922 (hereinafter also referred to as the FET), and the bipolar transistor 923 (hereinafter also referred to as the transistor). The bypass circuit 920 further has the bypass first input terminal 927, the bypass second input terminal 928, and the bypass output terminal 929. The bypass first input terminal 927 is connected to the cathode of the LED in the final stage of the first LED string 910 (hereinafter also referred to as the cathode of the first LED string 910) and to the anode of the LED in the initial stage of the second LED string 930 (hereinafter also referred to as the anode of the second LED string 930). The bypass second input terminal 928 is connected to the cathode of the LED in the final stage of the second LED string 930 (hereinafter also referred to as the cathode of the second LED string 930) via the current limit resistor 933. The FET 929 is an enhancement type nMOS-FET.

With reference to FIG. 2, the operation of the LED lighting device 900 is explained. FIG. 2A is a diagram illustrating part of the output signal of the bridge rectifier 905 and specifically, is a diagram illustrating the full-wave rectified waveform voltage of the output signal of the bridge rectifier 905. FIG. 2B is a diagram illustrating the waveform of the current I flowing through the LED lighting device 900. The horizontal axis in FIGS. 2A and 2B represents time, the vertical axis in FIG. 2A represents the voltage value, and the vertical axis in FIG. 2B represents the current value. The time represented by the horizontal axis in FIG. 2A is identical to the time represented by the horizontal axis in FIG. 2B. During the period of time t1, the output voltage of the bridge rectifier 905 does not reach the threshold voltage $V_{th1}$ of the first LED string 910, and therefore the circuit current I does not flow.

During the period of time t2 in the low voltage phase of the output voltage of the bridge rectifier 905, the output voltage of the bridge rectifier 905 exceeds the threshold voltage $V_{th1}$ of the first LED string 910, however, does not exceed the total threshold voltage of the threshold voltage $V_{th1}$ of the first LED string 910 and the threshold voltage $V_{th2}$ of the second LED string 930. During the period of time t2, the circuit current I returns to the bridge rectifier 905 via the bypass circuit 920. During the period of time t2, feedback is applied so that the base-emitter voltage of the transistor 923 is kept at 0.6 V and the bypass circuit 920 performs the constant current operation.

Next, during the last short period of time of the period of time t2, the output voltage of the bridge rectifier 905 becomes greater than the total threshold voltage of the threshold voltage $V_{th1}$ of the first LED string 910 and the threshold voltage $V_{th2}$ of the second LED string 930 and a current begins to flow through the bypass second input terminal 928 via the second LED string 930.

Next, during the period of time t3, the output voltage of the bridge rectifier 905 exceeds the total threshold voltage of the threshold voltage $V_{th1}$ of the first LED string 910 and the threshold voltage $V_{th2}$ of the second LED string 930 and a current flows through the bypass second input terminal 928 via the first and second LED strings 910 and 930. When a current flows through the bypass second input terminal 928, the transistor 923 is saturated, the gate-source voltage of the FET 922 becomes 0 or negative, and the FET 922 is turned off. When the FET 922 is turned off, the current input from the bypass first input terminal 927 of the bypass circuit 920 is only a minute current via the pull-up resistor 921 having a high resistance value and most of the current I flows via the first and second LED strings 910 and 930. During the period of time during which the output voltage of the bridge rectifier 905 decreases, the operation is performed sequentially in the opposite order of the operation during the period of time during which the voltage of the full-wave rectified waveform increases.

As described above, the conventional LED lighting device 900 illustrated in FIG. 1 controls the turning on and off of the bypass circuit 920 by the current flowing through the LED string, and therefore is characterized in that the circuit scale is reduced and noise is small, since the circuit current I changes smoothly. However, the conventional LED lighting device 900 illustrated in FIG. 1 has a problem in that a function to adjust the amount of emission of the LED string according to the use environment, i.e. the light control function is not provided.

On the other hand, it is known that light control of an incandescent bulb is performed using the TRIAC (registered trademark) dimmer. However, the alternating-current waveform output from the TRIAC (registered trademark) dimmer is a waveform part of which is lost, and therefore, in the case where the LED lighting device is lit, there is a possibility that flicker will be conspicuous.

Thus, Patent Document 2 describes that the rectifier configured to convert the AC power source into the DC power source is provided and the LED is lit by the DC voltage and light control thereof is performed. Specifically, Patent Document 2 describes the LED lighting device that performs light control by changing the voltage of the AC power source supplied to the LED lighting device (e.g., see FIG. 6 of Patent Document 2). Further, Patent Document 2 describes the LED light controller that performs light control by various kinds of digital control, such as pulse modulation and pulse width modulation, by using the processor-based controller (e.g., see FIG. 7 of Patent Document 2). The LED lighting device including the LED light controller described in Patent Document 2 enables lighting with inconspicuous flicker and light control.

However, the LED lighting device including the LED light controller described in Patent Document 2 needs to have an excellent DC power source and has a problem in that the light control circuit becomes complicated. In order to simplify the rectifier circuit, it is desirable to make it possible to light the LED by directly applying the undulating voltage in the full-wave rectified waveform etc. obtained from the commercial alternating-current power source to the LED.

In the case where light control of an incandescent lamp is performed by using the TRIAC (registered trademark) dimmer, the TRIAC (registered trademark) dimmer is embedded in the wall in many cases and additional construction to embed the TRIAC (registered trademark) dimmer in the wall is necessary, and therefore this is sometimes inconvenient. Thus, a method for setting the amount of light control without using the TRIAC (registered trademark) dimmer has been proposed and in this method, for example, ON/OFF control of a wall switch is utilized (e.g., see Patent Document 3).

FIG. 1 of Patent Document 3 illustrates the lighting device including the inverter circuit 1 that lights the lamp load L, the inverter control circuit 4, the power source shut-off detection circuit 2, and the time determination circuit 3. The inverter control circuit 4 changes the lighting state of the lamp load L by controlling the operation of the inverter circuit 1. The power source shut-off detection circuit 2 detects shut-off of the power source by the operation of the switch SW1. The time determination circuit 3 determines the time during which the power source is shut off by the power source shut-off time detection signal of the power source shut-off detection circuit 2 and selects the lighting state of the lamp load L by controlling the inverter control circuit 4 in the case where the time is equal or within a predetermined time set in advance. However, the control described in Patent Document 3 relates to lighting of the incandescent lamp, and the technique related to lighting of the LED is not described at all. Further, the lighting device described in Patent Document 3 uses an inverter circuit, and therefore there is a problem in that the inverter circuit is large and expensive.

FIG. 7 of Patent Document 4 illustrates the LED lighting device, for which light control can be performed, including the bridge rectifier 102, the toggle detector 74, the maintenance voltage supply circuit 71, the counter 96, and the LED lighting driver 80. The bridge rectifier 102 rectifies the AC voltage applied via the wall switch and provides a DC voltage. The toggle detector 74 monitors the toggle operation of the wall switch 98. The maintenance voltage supply circuit 71 provides a maintenance voltage and the counter 96 counts the toggle operation. The LED lighting driver 80 performs light control of the LED light source at multiple levels based on the counted value.

In the configuration described in Patent Document 4, pulse width modulation is performed after converting the output of the bridge rectifier 102 into a direct-current voltage with less ripple. In order to generate a direct-current voltage with less ripple necessary for pulse width modulation, an electrolytic capacitor having a high withstand voltage and a large capacitance is necessary. However, in addition to the size of the electrolytic capacitor being large, the life of the electrolytic capacitor becomes short in an environment of high temperature, such as in the LED lighting device. Further, in the LED lighting driver 80, almost all the components are turned into an integrated circuit. However, a variety of circuits, such as an oscillator circuit, are incorporated, and therefore the circuit configuration tends to become complicated.

Patent Document 1: WO 2011020007 A1
Patent Document 2: JP-2005-524960-A
Patent Document 3: JP-H4-115799-U
Patent Document 4: JP-2011-103285-A

SUMMARY

Technical Problem

An object of the present invention is to provide an LED lighting device in which an LED string is driven by an undulating voltage, which enables lighting with less flicker and light control, and which can be implemented by a simple circuit configuration.

Solution to Problem

An LED lighting device of the present invention includes an LED string including a plurality of LEDs connected in series; a rectifier to which an alternating-current power source is input and which outputs an undulating voltage to the LED string; a current limit circuit connected in series to the LED string and having a resistor element; and a control circuit configured to control a current flowing through the LED string by controlling the resistor element, thereby to perform light control of the LED string.

Further, it is preferable that the LED string includes a first LED string and a second LED string, the LED lighting device further includes a bypass circuit having a bypass first input terminal connected between the first LED string and the second LED string and a bypass second input terminal connected to an output terminal of the current limit circuit, and the bypass circuit causes a constant current to flow via the bypass first input terminal in a case where an undulating voltage output from the rectifier is between a threshold voltage of the first LED string and a total threshold voltage of the first LED string and the second LED string, and shuts off the current via the bypass first input terminal in a case where the undulating voltage exceeds the total threshold voltage.

Further, it is preferable that the LED lighting device further includes a detection circuit configured to detect turning on or off of a power source and to output a detection signal; and a voltage hold circuit configured to hold a voltage for a fixed time even if the power source is turned off, wherein the current limit circuit further has a switch, the resistor element is formed by a plurality of resistors connected to the switch, respectively, and the control circuit uses an output of the voltage hold circuit as a power source and switches the plurality of resistors by controlling the switch in accordance with the detection signal from the detection circuit.

Further, it is preferable that the rectifier is a bridge rectifier.

Further, it is preferable that the LED lighting device further includes a voltage drop circuit configured to drop an output voltage output from the rectifier, wherein an output voltage output from the voltage drop circuit is input to the voltage hold circuit and the detection circuit.

Further, it is preferable that the current limit circuit has a resistor string in which the plurality of resistors is connected in series and at least one of the plurality of resistors is short-circuited by the switch.

Further, it is preferable that the plurality of resistors is a plurality of constant current diodes having different current limit values.

Further, it is preferable that the LED string includes a first LED string and a second LED string, the LED lighting device further includes a bypass circuit having a bypass first input terminal connected between the first LED string and the second LED string, a bypass current control terminal, and a bypass variable resistor element, the bypass circuit causes a constant current to flow via the bypass first input terminal in a case where an undulating voltage output from the rectifier is between a threshold voltage of the first LED string and a total threshold voltage of the threshold voltages of the first and second LED strings, and shuts off the current via the bypass first input terminal in a case where the undulating voltage exceeds the total threshold voltage, and the control circuit inputs a bypass current control signal for controlling a current value of a constant current flowing via the bypass first input terminal by controlling the bypass variable resistor element to the bypass current control terminal.

Further, it is preferable that the resistor element is a variable resistor element, the current limit circuit further has a limit circuit input terminal connected to the second LED string and a limit circuit control terminal, the current limit circuit causes a constant current to flow via the limit circuit input terminal in a case where an undulating voltage exceeds the total threshold voltage, and the control circuit inputs a limit circuit control signal for controlling the current value of a constant current flowing via the limit circuit input terminal by controlling the variable resistor element to the limit circuit control terminal.

Further, it is preferable that the bypass current control signal and the limit circuit control signal are the same signal.

Further, it is preferable that the bypass circuit further has a first bipolar transistor, a first field effect transistor of enhancement type, a first pull-up resistor, a bypass second input terminal connected to a limit circuit output terminal, which is an output terminal of the current limit circuit, and a bypass output terminal, the bypass first input terminal is connected to one terminal of the first pull-up resistor and to the drain of the first field effect transistor, the other terminal of the first pull-up resistor is connected to the gate of the first field effect transistor and to the collector of the first bipolar transistor, the bypass second input terminal is connected to the source of the first field effect transistor, to the base of the first bipolar transistor, and to one terminal of the bypass variable resistor element, and the bypass output terminal is connected to the emitter of the first bipolar transistor and to the other terminal of the bypass variable resistor element.

Further, it is preferable that the current limit circuit further has a second bipolar transistor, a second field effect transistor of enhancement type, a second pull-up resistor, and a limit circuit input terminal, the limit circuit input terminal is connected to one terminal of the second pull-up resistor and to the drain of the second field effect transistor, the other terminal of the second pull-up resistor is connected to the gate of the second field effect transistor and to the collector of the bipolar transistor, the source of the field effect transistor is connected to the base of the bipolar transistor and to one terminal of the bypass variable resistor element, and the limit circuit output terminal is connected to the emitter of the second bipolar transistor and to the other terminal of the bypass variable resistor element.

Further, it is preferable that the bypass circuit further has a third field effect transistor of depletion type, a bypass second input terminal connected to a limit circuit output terminal, which is an output terminal of the current limit circuit, and a bypass output terminal, the bypass first input terminal is connected to the drain of the third field effect transistor, the bypass second input terminal is connected to the source of the third field effect transistor and to one terminal of the bypass variable resistor element, and the bypass output terminal is connected to the gate of the third field effect transistor and to the other terminal of the bypass variable resistor element.

Further, it is preferable that the current limit circuit further has a fourth field effect transistor of depletion type, the limit circuit input terminal is connected to the drain of the fourth field effect transistor, the source of the fourth field effect transistor is connected to one terminal of the variable resistor element, and the limit circuit output terminal is connected to the gate of the fourth field effect transistor and to the other terminal of the variable resistor element.

Advantageous Effects of Invention

Since an LED lighting device of the present invention includes a current limit circuit connected in series to the LED string and having a resistor element; and a control circuit configured to control a current flowing through the LED string by controlling the resistor element, thereby to perform light control of the LED string, the LED lighting device of the present invention enables lighting with less flicker and light control, and can be implemented by a simple circuit configuration.

BRIEF DESCRIPTION OF DRAWINGS

FIG. 10 is a wave shape diagram in which the operation of the LED lighting device in FIG. 9 is explained;

FIG. 11 is a circuit diagram illustrating another example of an LED lighting device;

Hereinafter, with reference to FIGS. 3 to 11, the LED lighting device is explained in detail. In the explanation of the drawings, the same symbol is attached to the same or corresponding component and duplicated explanation is omitted. The partial scaling of the waveform etc. is changed appropriately for explanation. Further, the relationship with the invention specifying item described in the claims is described within brackets.

Figure 1:
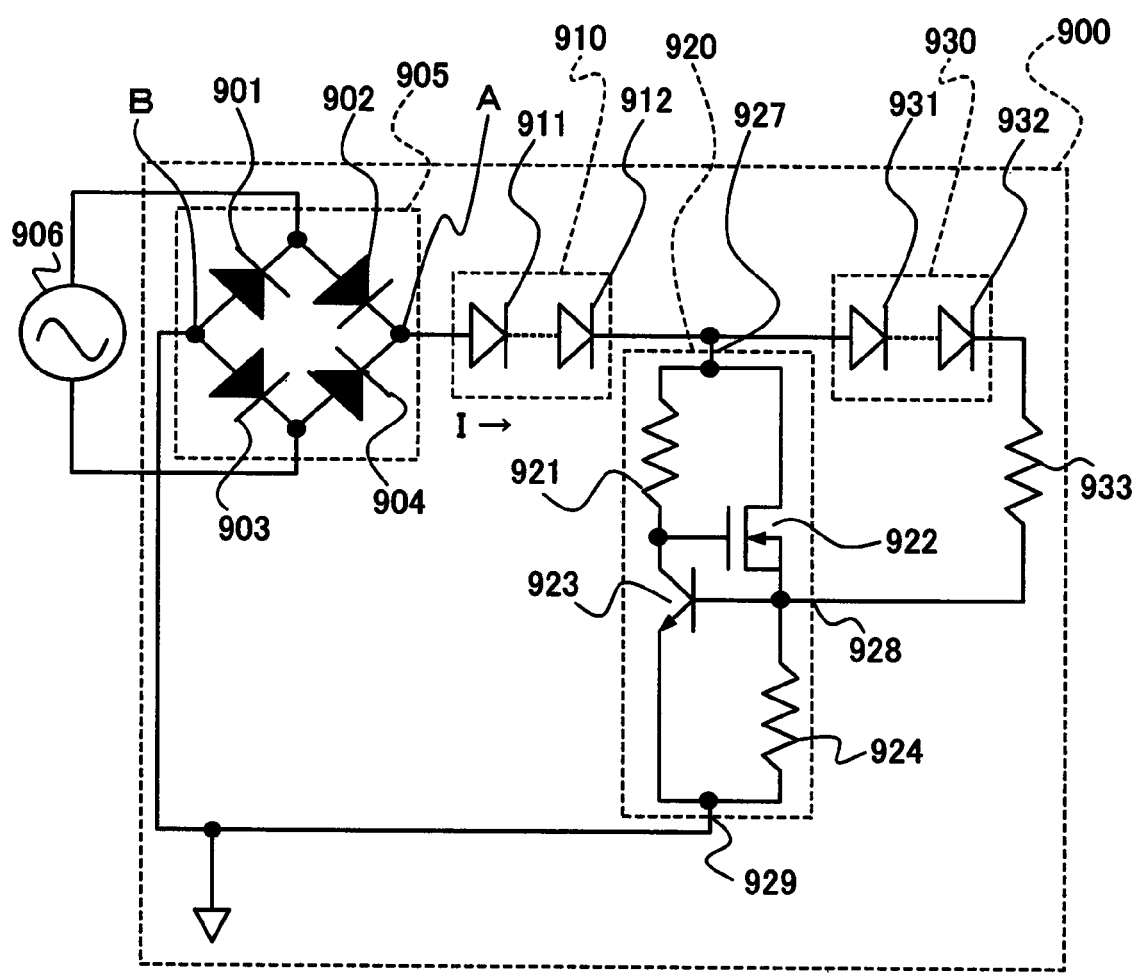
FIG. 1 is a circuit diagram illustrating a traditional light emitting unit.
Figure 2:
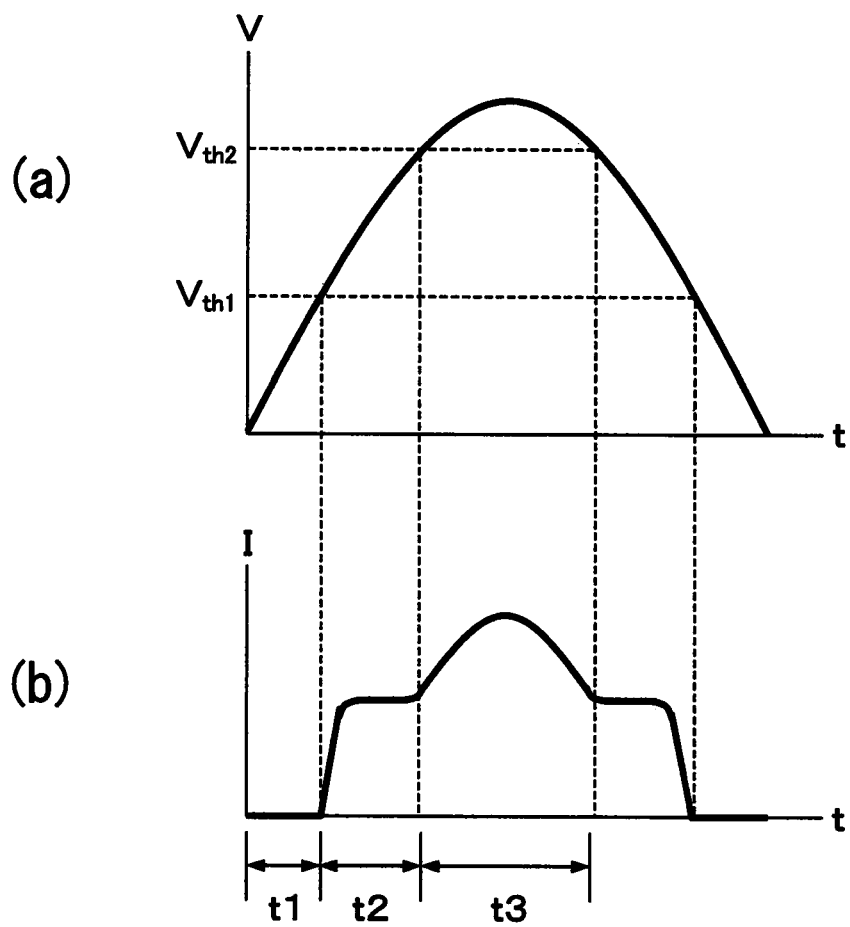
FIG. 2 is a wave shape diagram in which the operation of the LED lighting device in FIG. 1 is explained.
Figure 3:
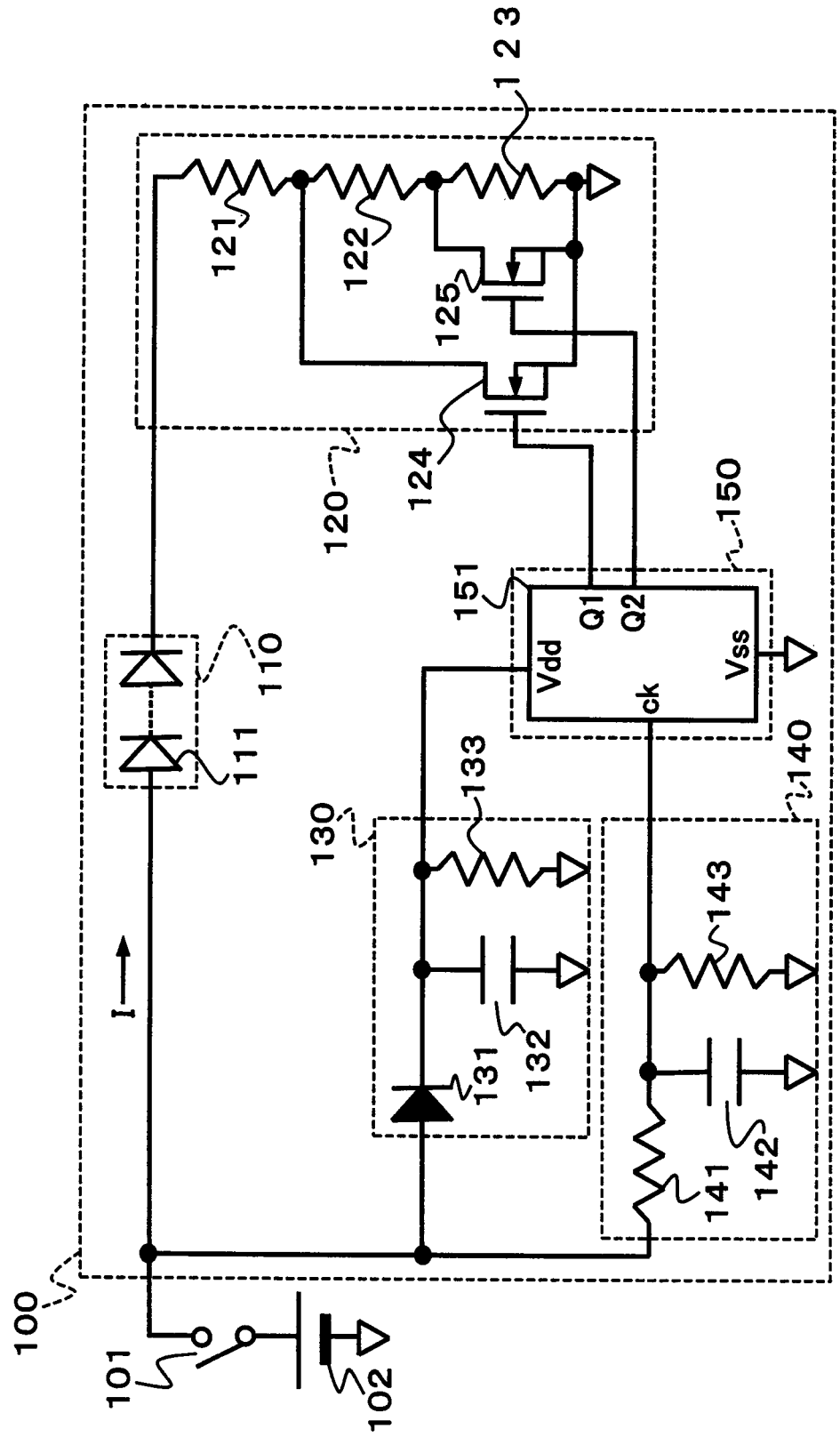
FIG. 3 is a circuit diagram illustrating an example of an LED lighting device.

With reference to FIG. 3, an LED lighting device 100 is explained. FIG. 3 is a circuit diagram illustrating the LED lighting device 100.

The LED lighting device 100 has an LED string 110, a current limit circuit 120, a voltage hold circuit 130, a detection circuit 140, and a control circuit 150. Outside the LED lighting device 100, a direct-current power source 102 that supplies a direct current and a power source switch 101 that turns on/off the electrical connection between the LED lighting device 100 and the direct-current power source 102 are arranged. Power to drive the LED string 110, the voltage hold circuit 130, and the detection circuit 140 is supplied from the direct-current power source 102 via the power source switch 101. In the drawings of the present application, an inverted solid white triangle indicates a reference voltage wire also referred to as a ground or VSS.

The LED string 110 has a single LED 111 or a plurality of LEDs 111 connected in series. The anode of the LED string 110 is connected to the direct-current power source 102 via the power source switch 101. The number of LEDs included in the LED string 110 is determined based on the forward voltage of the LED and the value of a voltage supplied from the power source switch 101. In the case where the forward voltage of the LED 111 is about 3 V and the value of the voltage supplied from the power source switch 101 is a direct-current voltage of 12 V used in a halogen lamp, the number of LEDs 111 included in the LED string 110 is three or four.

The current limit circuit 120 has three resistors 121, 122, and 123 and two nMOS field effect transistors 124 and 125 (hereinafter also referred to as the FET). The three resistors 121, 122, and 123 are connected in series and the upper terminal of the resistor 121 is connected to the cathode of the LED string 110 and the lower terminal of the resistor 123 is connected to the reference voltage wire. The drain of the FET 124 is connected to the connection part between the resistors 121 and 122 and the source of the FET 124 is connected to the reference voltage wire. The drain of the FET 125 is connected to the connection part between the resistors 122 and 123 and the source of the FET 125 is connected to the reference voltage wire.

The voltage hold circuit 130 has a diode 131, a capacitor 132, and a resistor 133. The anode of the diode 131 is connected to the direct-current power source 102 via the power source switch 101. The cathode of the diode 131 is connected to the upper terminal of the capacitor 132 and to the upper terminal of the resistor 133. The lower terminal of the capacitor 132 and the lower terminal of the resistor 133 are connected to the reference voltage wire. The capacitance value of the capacitor 132 and the resistance value of the resistor 133 are determined so that the time constant specified by the capacitance value of the capacitor 132 and the resistance value of the resistor 133 is sufficiently longer than the time during which the power source switch 101 is turned on and off in an instant.

The detection circuit 140 has a resistor 141, a capacitor 142, and a resistor 143. One terminal of the resistor 141 is connected to the direct-current power source 102 via the power source switch 101. The other terminal of the resistor 141 is connected to the upper terminals of the capacitor 142 and the resistor 143. The lower terminals of the capacitor 142 and the resistor 143 are connected to the reference voltage wire. The capacitance value of the capacitor 142 and the resistance value of the resistor 143 are determined so that the time constant specified by the capacitance value of the capacitor 142 and the resistance value of the resistor 143 is shorter than the time during which the power source switch 101 is turned on and off in an instant.

The control circuit 150 has a counter 151. A + side power source terminal Vdd of the counter 151 is connected to the cathode of the diode 131, which is a backflow check element, and a − side power source terminal Vss is connected to the reference voltage wire. A clock terminal ck of the counter 151 is connected to one terminal of the resistor 141. Two-bit output terminals Q1 and Q2 of the counter 151 are connected to the gates of the FETs 124 and 125, respectively. The control circuit 150 controls a current flowing through the LED string 10 by controlling the FET 124 the drain of which is connected between the resistors 121 and 122 and the FET 125 the drain of which is connected between the resistors 122 and 123 and performs light control of the LED string 10. The counter 151 is formed so as to sequentially output a count-up output signal to the 2-bit output terminals Q1 and Q2 when a rise signal is input to the clock terminal ck. The counter 151 sequentially outputs 00, 01, and 10 to the 2-bit output terminals Q1 and Q2 each time a rise signal is input to the clock terminal ck. When a rise signal is input to the clock terminal ck after the 2-bit output terminals Q1 and Q2 become 10, the 2-bit output terminals Q1 and Q2 return to 00. In the case where the counter 151 is formed by a CMOS transistor, the current consumed in the counter 151 will be an amount that can be ignored.

The control flow of light control in the LED lighting device 100 is explained.

First, when the power source switch 101 is turned on (brought into conduction), a power source voltage is applied to the + side power source terminal Vdd of the counter 151 via the diode 131. The input signal to the clock terminal ck of the counter 151 turns to the high level after a delay time, about the same as the time constant determined by the resistance value of the resistor 141 and the capacitance value of the capacitor 142, elapses. When the input signal to the clock terminal ck turns to the high level, the signals output from the output terminals Q1 and Q2 of the counter 151 become 00 (the counter 151 has the positive logic, and therefore, 0 corresponds to the low level. In the following explanation, it is premised that the counter 151 has the positive logic). Both the output terminals Q1 and Q2 of the counter 151 turn to the low level, and therefore both the FETs 124 and 125 enter the off state. When both the FETs 124 and 125 enter the off state, a current I indicated by an arrow flows through the reference voltage wire via the three resistors 121, 122, and 123.

If the output voltage of the direct-current power source 102 is taken to be V0 (V), the number of LEDs 111 included in the LED string 110 to be n, the forward voltage of the LED 111 to be Vf (V), and a combined resistance value of the resistor string including the three resistors 121, 122, and 123 to be R3 (Ω), the current I is expressed as follows.

$$I=(V0-n\cdot Vf)/R3$$

As indicated by the above expression, the current I is limited by the combined resistance value of the three resistors 121, 122, and 123.

Next, the power source switch 101 is turned off (opened) and in a short time during which the voltage between the terminals of the capacitor 132 is held at a voltage equal to or greater than a predetermined voltage, the power source switch 101 is turned on again. While the power source switch 101 is in the off state, the voltage hold circuit 130 maintains the voltage equal to or greater than the predetermined voltage by the capacitor 132. On the other hand, since the time constant specified by the capacitance value of the capacitor 142 and the resistance value of the resistor 143 is small, the capacitor 142 of the detection circuit 140 discharges while the power source switch 101 is in the off state and the voltage at the upper terminal of the capacitor 142 becomes 0 (low level).

When the power source switch 101 is turned on after being turned off, the signal at the clock terminal ck of the counter 151 rises. When the signal at the clock terminal ck rises, the output signals of the outputs Q1 and Q2 of the counter 151 turn to 01 from 00. Since the output signal of the output Q2 turns to the high level, the FET 125 turns on. When the FET 15 turns on, the current I flows through the reference voltage wire via the resistors 121 and 122 and the FET 125. The combined resistance value of the resistor string including the resistors 121 and 122 becomes smaller than the combined resistance value of the resistor string including the resistors 121, 122, and 123. Thus, the value of the current I after the turning on and off in an instant has a value larger than that of the current I before the turning on and off in an instant (before the power source switch 101 is turned off, i.e., the current when the current I flows through the resistors 121, 122, and 123). Since the value of the current I becomes large, the brightness of the LED string 110 after the turning on and off in an instant becomes higher than the brightness of the LED string 110 before the turning on and off in an instant.

Further, the power source switch 101 is turned off and then is turned on again in a short time. When the power source switch 101 is turned on, the output signals of the output terminals Q1 and Q2 turn to 10, and the FET 125 is turned off and the FET 124 is turned on. When the FET 125 is turned off and the FET 124 is turned on, the current I flows through the reference voltage wire via the resistor 121 and the FET 124. In this case, the resistance value of the path through which the current I flows is the resistance value of the resistor 121, and therefore the value of the current I becomes larger than a value when the power source switch 101 is turned on for the first time and than a value when the power source switch is turned on and off in an instant. When the value of the current I becomes the largest, the brightness of the LED string 110 in this case becomes the highest.

When the power source switch 101 is further turned off and then is turned on again in a short time, the output signals of the output terminals Q1 and Q2 of the counter 151 return to 00. When the output signals of the output terminals Q1 and Q2 of the counter 151 return to 00, the brightness of the LED string 110 returns to the lowest state. It may also be possible to add a function to the LED lighting device, which resets the counter 151 when the power source switch 101 is turned on for the first time, by inserting a power on reset circuit between the cathode of the diode 131 and a rest terminal, not shown, of the counter 151. In the LED lighting device 100, the control circuit 150 has the counter 151. However, the control circuit 150 is required only to have a function to sequentially switch the FETs 124 and 125 by the output signal of the detection circuit 140, and therefore it is possible to replace the control circuit with another circuit. For example, it may also be possible for the control circuit 150 to have a configuration having a circuit, which is a combination of a counter and a decoder, or a shift register.

Figure 4:
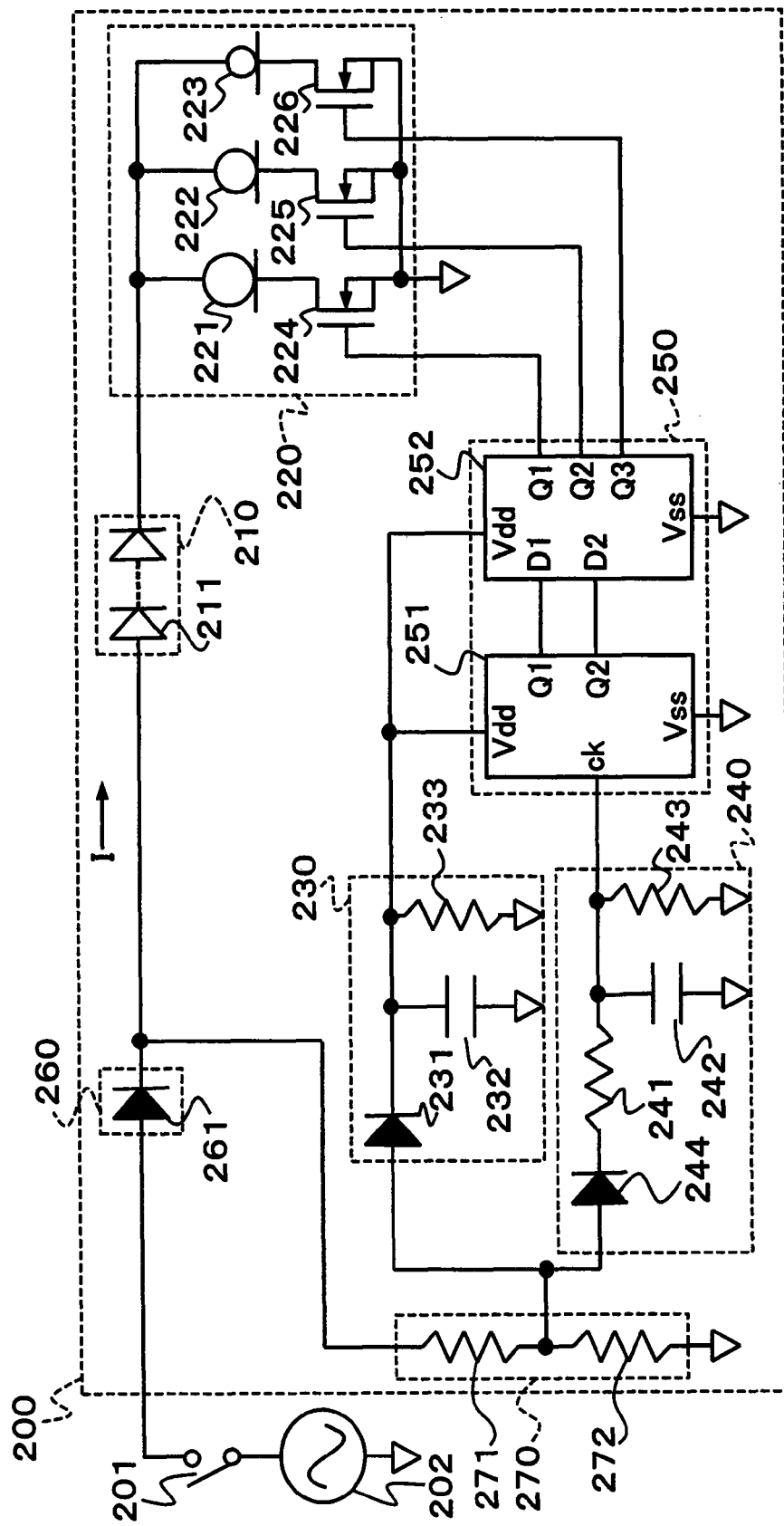
FIG. 4 is a circuit diagram illustrating another example of an LED lighting device.
Figure 5:
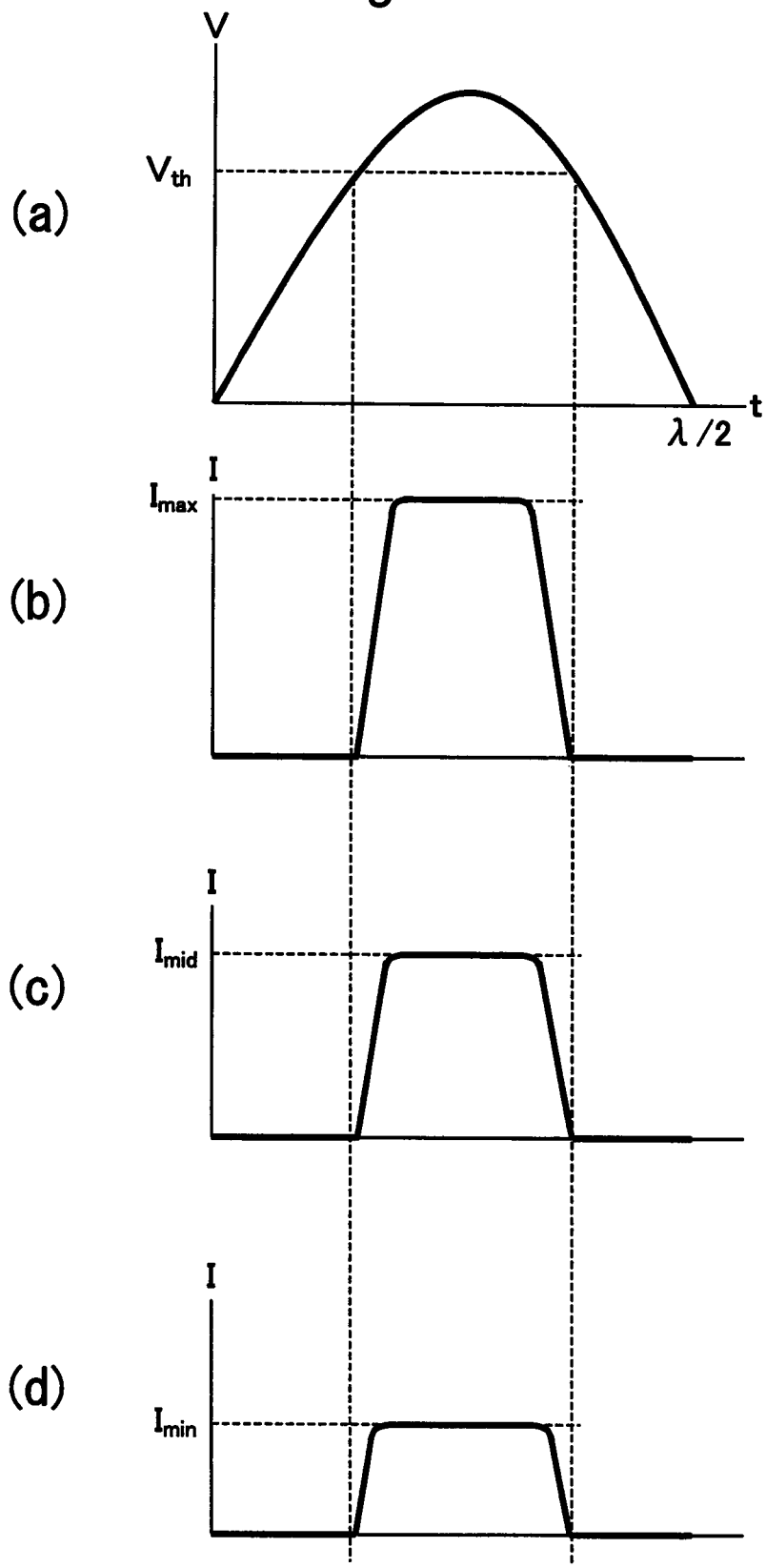
FIG. 5 is a wave shape diagram in which the operation of the LED lighting device in FIG. 4 is explained.

FIG. 4 is a circuit diagram showing an LED lighting device 200. The LED lighting device 100 illustrated in FIG. 3 uses the direct-current power source 102 as a power source. In the LED lighting device 100, as an element that limits a current, the resistors 121, 122, and 123 are used. The circuit configuration in which the current is limited by using a resistor element may be a simple circuit configuration. However, the value of a current flowing through the LED changes in accordance with the variation in the power source voltage, and therefore the brightness of the LED tends to become unstable. In order to solve such a problem, as a circuit configuration for limiting a current, a constant current element or a constant current circuit is adopted. With reference to FIG. 4 and FIG. 5, the LED lighting device 200 is explained, in which the power source that supplies power is an alternating-current power source and a constant current element is adopted as a circuit configuration for limiting a current. In the present specification, the current and the voltage, which are a current or a voltage obtained by rectifying alternating-current power by a half-wave rectifier circuit, a full-wave rectifier circuit, etc., and not subjected to filtering by a smoothing circuit, are referred to as a pulsating current and an undulating voltage, respectively.

The LED lighting device 200 has an LED string 210, a current limit circuit 220, a voltage hold circuit 230, a detection circuit 240, a control circuit 250, a voltage drop circuit 270, and a rectifier circuit 260.

The LED string 210 has a single LED 211 or a plurality of LEDs 211 connected in series. In the case where the alternating-current power source the effective value of which is 12 V is used, the number of stages of the LEDs 211 connected in series is three or four. In the case where the alternating-current power source the effective value of which is 100 is used, the number of stages of the LEDs 211 connected in series is about 30 to 40. In the case where the alternating-current power source the effective value of which is 240 V is used, the number of stages of the LEDs 211 connected in series is about 80.

The current limit circuit 220 has three constant current diodes 221, 222, and 223 and three FETs 224, 225, and 226. The current flowing through the constant current diode 221 is larger in magnitude than the current flowing through the constant current diode 222. Further, the current flowing through the constant current diode 222 is larger than the current flowing through the constant current diode 223. The anodes of the three constant current diodes 221, 222, and 223 are connected to the cathode of the LED string 210. The cathodes of the three constant current diodes 221, 222, and 223 are connected to the drains of the FETs 224, 225, and 226, respectively. The sources of the FETs 224, 225, and 226 are connected to the reference voltage wire.

The voltage hold circuit 230 has a diode 231, a capacitor 232, and a resistor 233. The anode of the diode 231 is connected to the connection part between resistors 271 and 272. The configuration of the voltage hold circuit 230 is equal to that of the voltage hold circuit 130 except for the connection destination of the anode of the diode 231. However, the withstand voltage of the capacitor 232 of the voltage hold circuit 230 may be made different from the withstand voltage of the capacitor 132 of the voltage hold circuit 130.

The detection circuit 240 has a resistor 241, a capacitor 242, a resistor 243, and a diode 244. The diode 244 is for checking a backflow and the anode of which is connected to the connection part between the resistors 271 and 272. The configuration of the detection circuit 240 is equal to the configuration of the detection circuit 140, except in that the cathode of the diode 244 is connected to one terminal of the resistor 241. However, the withstand voltage of the capacitor 242 of the detection circuit 240 may be made different from the withstand voltage of the capacitor 142 of the detection circuit 140.

The control circuit 250 has a counter 251 and a decoder 252. The configuration of the counter 251 is the same as the configuration of the counter 151 explained previously. The 2-bit output terminals Q1 and Q2 of the decoder 252 are connected to input terminals D1 and D2 of the decoder 252. The output terminals Q1 and Q2 and an output terminal Q3 of the decoder 252 are connected to the gates of the FETs 224, 225, and 226, respectively. Among the output signals of the output terminals Q1, Q2, and Q3 of the decoder 252, only one output signal turns to the high level in accordance with the state of the input terminals D1 and D2. The counter 251 and the decoder 252 can be downsized, since they operate on a power source the voltage of which is reduced by the voltage drop circuit 270 and the voltage hold circuit 230, as will be described later.

The rectifier circuit 260 has a diode 261. The anode of the diode 261 is connected to an alternating-current power source 202 via a power source switch 201 and the cathode thereof is connected to the anode of the LED string 210 and to the upper terminal of the resistor 271. The other terminal of the alternating-current power source 202 illustrated on the lower side in FIG. 4 is connected to the reference voltage wire. The rectifier circuit 260 rectifies the voltage input from the alternating-current power source 202 and outputs an undulating voltage.

The voltage drop circuit 270 has the resistors 271 and 272 connected in series. The upper terminal of the resistor 271 is connected to the cathode of the diode 261 and the lower terminal of the resistor 272 is connected to the reference voltage wire. The voltage drop circuit 270 outputs a signal having a half-wave rectified waveform the voltage of which is reduced by dividing the voltage of the signal having the half-wave rectified waveform output from the diode 261 when the power source switch 201 is turned on (brought into conduction).

The voltage hold circuit 230 has the backflow check diode 231, the capacitor 232, and the resistor 233. The output terminal of the voltage hold circuit 230 is connected to the + side power source terminals Vdd of the counter 251 and the decoder 252. The voltage hold circuit 230 smoothes the signal having the half-wave rectified waveform, the voltage of which is reduced, output from the voltage drop circuit 270 and outputs the smoothed signal to the + side power source terminals Vdd of the counter 251 and the decoder 252.

The detection circuit 240 has the resistor 241, the capacitor 242, and the resistor 243. The output terminal of the detection circuit 240 is connected to the clock terminal ck of the counter 251. The output signal of the detection circuit 240 rises after the delay time of the time constant specified by the resistor 241 and the capacitor 242 elapses.

The control flow of light control in the LED lighting device 200 is explained.

First, when the power source switch 201 is turned on (brought into conduction), a voltage is applied to the + side power source terminals Vdd of the counter 251 and the decoder 252. The input signal at the clock terminal ck of the counter 251 turns to the high level after the delay time elapses, which is about the time constant determined by the resistance value of the resistor 241 and the capacitance value of the capacitor 242, and the output signals at the output terminals Q1 and Q2 of the counter 251 become 00. The output signal at the output terminal Q1 of the decoder 252 turns to the high level and the output signals at the outputs Q2 and Q3 of the decoder 252 turn to the low level. When the output signal at the output terminal Q1 of the decoder 252 turns to the high level, the FET 224 enters the on state and the FETs 225 and 226 enter the off state, and therefore the current I flows via the constant current diode 221 and the brightness of the LED string 210 becomes the highest.

Next, the power source switch 201 is turned off and then turned on again in a short time. While the power source switch 201 is in the off state, the voltage at the + side power source terminal Vdd of the voltage hold circuit 230 is maintained by the capacitor 232. On the other hand, the capacitor 242 of the detection circuit 240 is discharged and the voltage at the upper terminal becomes 0 V (low level). The time constant determined by the capacitor 232 and the resistor 233, the time constant determined by the capacitor 242 and the resistor 243, and the current consumption of the control circuit 250 are the same as those of the voltage hold circuit 130, the detection circuit 140, and the control circuit 150 explained previously.

Next, when the power source switch 201 is turned off and then turned on in an instant, the output signals at the output terminals Q1 and Q2 of the counter 251 become 01. When the input signal of 01 is input to the input terminals D1 and D2 of the decoder 252, the output signal at the output terminal Q2 of the decoder 252 turns to the high level and the output signals at the output terminals Q1 and Q3 of the decoder 252 turn to the low level. When the output signal at the output terminal Q2 of the decoder 252 turns to the high level, the FET 252 enters the on state and the FETs 224 and 226 enter the off state, and therefore the current I flows via the constant current diode 222 and the brightness of the LED string 210 becomes an intermediate level.

Next, when the power source switch 201 is turned off and then turned on in an instant, the output signals at the output terminals Q1 and Q2 of the counter 251 become 10. When the input signal of 10 is input to the input terminals D1 and D2 of the decoder 252, the output signal at the output terminal Q3 of the decoder 252 turns to the high level and the output signals at the output terminals Q1 and Q2 of the decoder 252 turn to the low level. Then, the FET 226 turns on. When the output signal at the output terminal Q3 of the decoder 252 turns to the high level, the FET 226 enters the on state and the FETs 224 and 225 enter the off state, and therefore the current I flows via the constant current diode 223 and the brightness of the LED string 210 becomes the lowest. Then, when the power source switch 201 is further turned off and then turned on in an instant, the counter 251 returns to the initial state and the brightness of the LED string 210 becomes the highest.

By using FIG. 5, the operation of the LED lighting device 200 illustrated in FIG. 4 is explained. FIG. 5(a) is a diagram illustrating part of the output signal of the rectifier circuit 260 and specifically, FIG. 5(a) is a diagram illustrating a period during which the voltage having the half-wave rectified waveform of the output signal of the rectifier circuit 260 exists. FIG. 5(b) is a diagram illustrating the waveform of the current I that flows when the brightness of the LED lighting device 200 becomes the highest. FIG. 5(c) is a diagram illustrating the waveform of the current I that flows when the brightness of the LED lighting device 200 becomes an intermediate level. FIG. 5(d) is a diagram illustrating the waveform of the current I that flows when the brightness of the LED lighting device 200 becomes the lowest. Here, the horizontal axis in each of FIGS. 5A to 5D represents time, the vertical axis in FIG. 5(a) represents the voltage value, and the vertical axis in each of FIGS. 5B to 5D represents the current value. The time represented by the horizontal axis in each of FIGS. 5A to 5D is identical to one another and the absolute value of the current value represented by the vertical axis in each of FIGS. 5B to 5D is identical to one another. In the following explanation, the symbols, the terminal names, etc., in FIG. 4 are referred to.

If the number of LEDs 211 included in the LED string 210 is taken to be n and the forward voltage of the LED 211 to be Vf (V), the threshold value of the LED string 210 will be n·Vf (V). Thus, during the period of time before the voltage of the output signal of the rectifier circuit 260 illustrated in FIG. 5(a) reaches a threshold voltage $V_{th}$ and during the period of time after the voltage becomes less than the threshold voltage $V_{th}$, the current I does not flow as illustrated in FIGS. 5B, 5C, and 5D. In FIG. 5(b), when the voltage of the output signal of the rectifier circuit 260 exceeds the threshold voltage $V_{th}$, the current I increases rapidly and becomes a constant value after reaching a limit current value $I_{max}$ of the constant current diode 221. After that, when the voltage of the output signal of the rectifier circuit 260 decreases and approaches the threshold voltage $V_{th}$, the current I decreases rapidly. Similarly, in FIGS. 5C and 5D, when the voltage of the output signal of the rectifier circuit 260 exceeds the threshold voltage $V_{th}$, the current I increases rapidly and becomes a constant value after reaching a limit current value $I_{mid}$ of the constant current diode 222 and a limit current value $I_{min}$, of the constant current diode 223, respectively. After that, when the voltage of the output signal of the rectifier circuit 260 decreases and approaches the threshold voltage $V_{th}$, the current I decreases rapidly.

Figure 6:
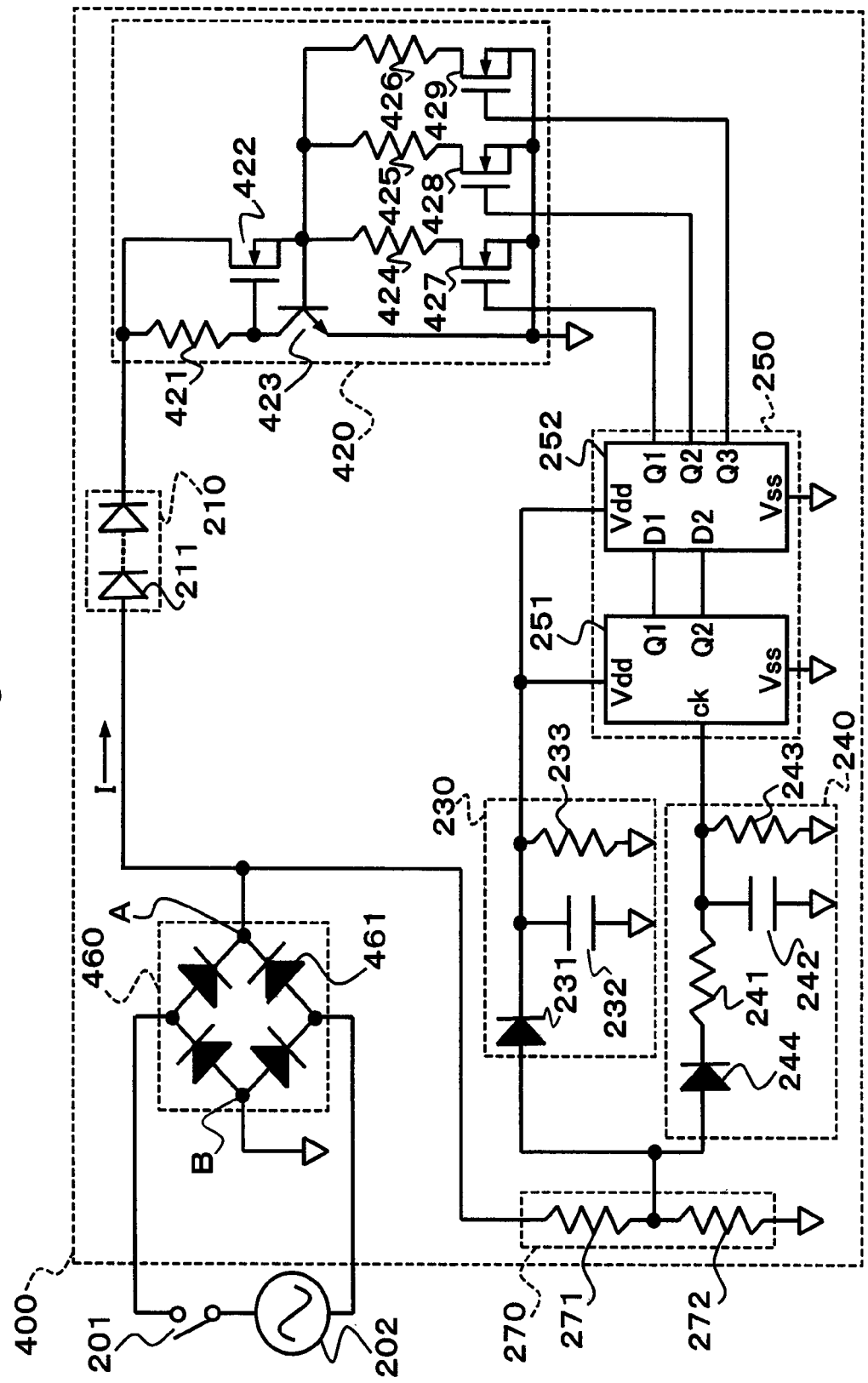
FIG. 6 is a circuit diagram illustrating another example of an LED lighting device.

FIG. 6 is a circuit diagram illustrating an LED lighting device 400. The rectifier circuit 260 of the LED lighting device 200 illustrated in FIG. 4 is formed by a single diode. However, it is possible to improve efficiency by forming the rectifier circuit by a bridge rectifier including four diodes and by performing full-wave rectification. Further, in the LED lighting device 200, the constant current diodes 221, 222, and 223 are adopted as a resistor element for controlling the current limit value, however, there is a case where a constant current circuit is used as a current limit circuit. With reference to FIG. 6, the LED lighting device 400 in which a bridge rectifier is adopted as a rectifier circuit and a constant current circuit is adopted as a current limit circuit is explained.

The LED lighting device 400 has the LED string 210, a current limit circuit 420, the voltage hold circuit 230, the detection circuit 240, the control circuit 250, the voltage drop circuit 270, and a bridge rectifier 460. The LED string 210, the voltage hold circuit 230, the detection circuit 240, the control circuit 250, and the voltage drop circuit 270 are the same as the circuits explained with reference to FIG. 4.

The bridge rectifier 460 has four diodes 461, and an alternating-current input terminal of the bridge rectifier 460 is connected to the alternating-current power source 202 via the power source switch 201. A terminal A of the bridge rectifier 460 is a terminal from which a current is output and is connected to the anode of the LED string 210 and to the upper terminal of the resistor 271 arranged inside the voltage drop circuit 270. A terminal B of the bridge rectifier 460 is a terminal into which a current flows and is connected to the reference voltage wire. The bridge rectifier 460 rectifies the voltage input from the alternating-current power source 202 and outputs an undulating voltage.

The current limit circuit 420 has resistors 421, 424, 425, and 426, FETs 422, 427, 428, and 429, and an NPN type bipolar transistor 423 (hereinafter also referred to simply as a transistor). The resistors 424, 425, and 426 are each an element for controlling the current limit value and the FETs 427, 428, and 429 are each a switch for switching the elements for controlling the current limit value. The upper terminal of the resistor 421 and the drain of the FET 422 are connected to the cathode of the LED string 210. The emitter of the transistor 423 and the sources of the FETs 427, 428, and 429 are connected to the reference voltage wire. The lower terminal of the resistor 421 is connected to the collector of the transistor 423 and to the gate of the FET 422. The source of the FET 422 is connected to the base of the transistor 423 and to the upper terminals of the resistors 424, 425, and 426. The lower terminals of the resistors 424, 425, and 426 are connected to the drains of the FETs 427, 428, and 429, respectively.

In the current limit circuit 420, feedback is applied so that the base-emitter voltage of the transistor 423 is kept at 0.6 V, whereby the current flowing through the FET 422 is limited.

Specifically, when the output voltage of the bridge rectifier 460 increases, the current flowing through the current limit circuit 420 via the LED string 210 increases. When the current flowing through the resistor 424, 425, or 426 increases, the voltage between the terminals of the resistor 424, 425, or 426, i.e. the base-emitter voltage of the transistor 423 increases from 0.6 V and the base current of the transistor 423 flows. By the base current of the transistor 423 flowing, a current flows between the collector and emitter of the transistor 423 and a difference in potential occurs between the terminals of the resistor 421. When a difference in potential occurs between the terminals of the resistor 421, the gate-source voltage of the FET 422 decreases and the drain current of the FET 422, i.e. the current flowing through the resistor 424, 425, or 426 decreases. When the current flowing through the resistor 424, 425, or 426 decreases until the base-emitter voltage of the transistor 423 becomes 0.6 V, the base current of the transistor 423 becomes zero. Since the base current of the transistor 423 becomes zero, feedback is applied so that the base-emitter voltage of the transistor 423 is kept at 0.6 V.

The resistance values of the resistor 424, the resistor 425, and the resistor 426 are set, respectively, so that the resistance value increases in the order of the resistor 424, the resistor 425, and the resistor 426. When the FET 427 enters the on state, the current I becomes the largest and the brightness of the LED string 210 becomes the highest. When the FET 428 enters the on state, the current I takes an intermediate value and the brightness of the LED string 210 becomes an intermediate level. When the FET 429 enters the on state, the current I becomes the smallest and the brightness of the LED string 210 becomes the lowest.

The operation flow of the power source switch 201 and the output current waveform are the same as those of the LED lighting device 200 explained with reference to FIG. 4. In the LED lighting device 400, the bridge rectifier 460 performs full-wave rectification of the alternating current output from the alternating-current power source 202, and therefore the lighting period is halved and the number of times of lighting is doubled and the brightness becomes higher. In the LED lighting device 400, the voltage waveform in FIG. 5(*a*) corresponds to one period of the full-wave rectified waveform.

Figure 7:
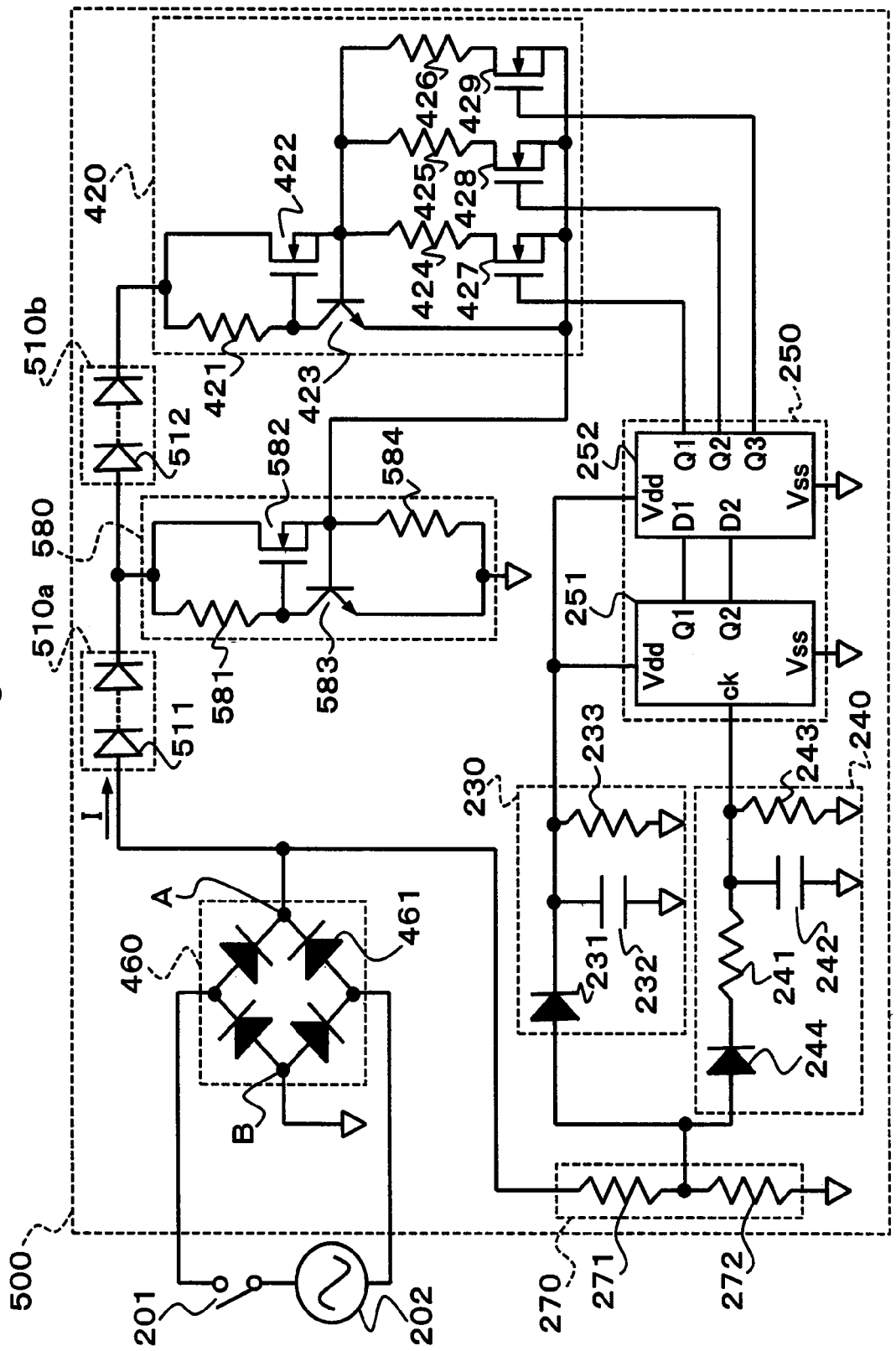
FIG. 7 is a circuit diagram illustrating another example of an LED lighting device.
Figure 8:
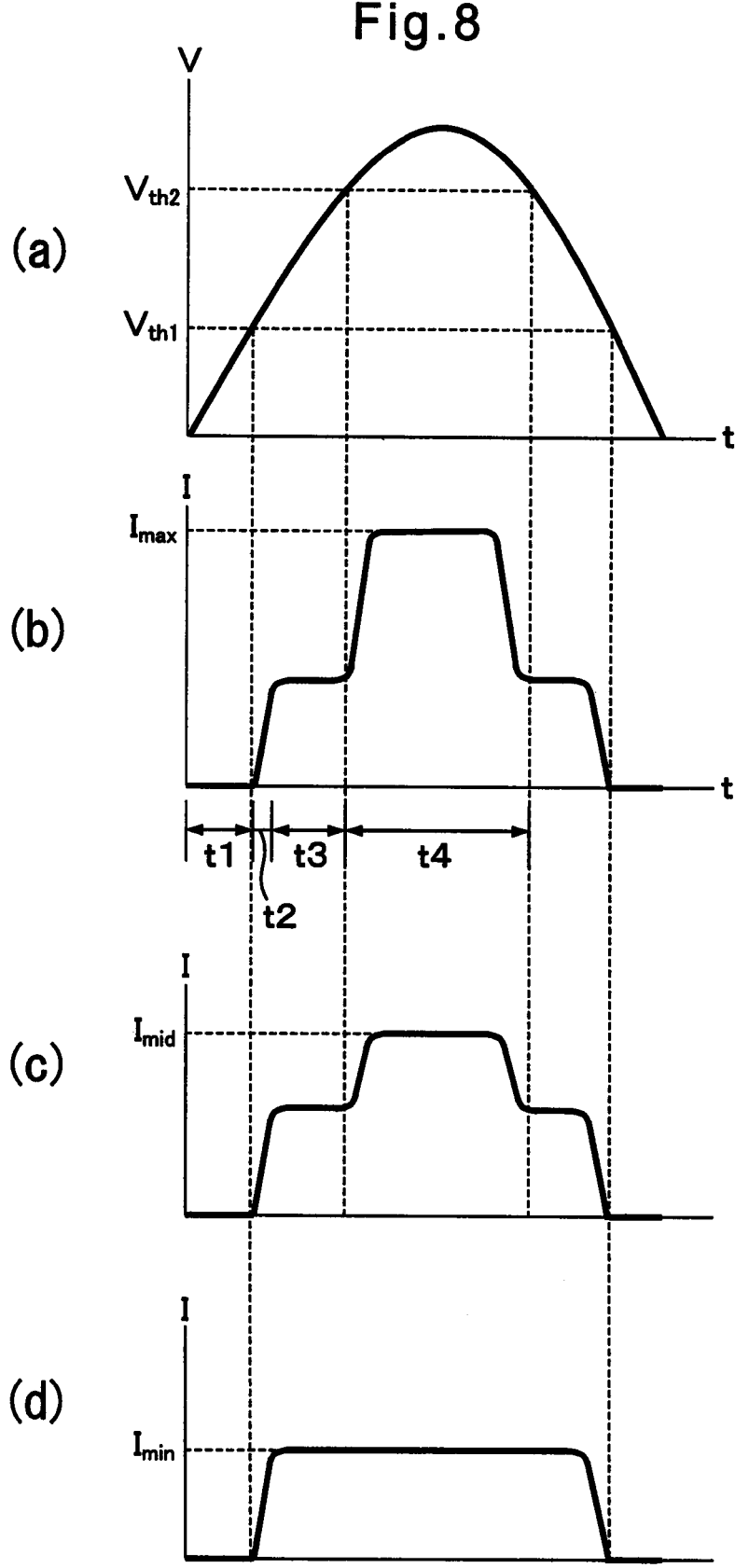
FIG. 8 is a wave shape diagram in which the operation of the LED lighting device in FIG. 7 is explained.

FIG. 7 is a circuit diagram illustrating an LED lighting device 500. In the LED lighting device 400 illustrated in FIG. 6, the period of time during which the LED string is lit is only the period of time during which the full-wave rectified waveform exceeds the threshold voltage of the LED string 210. If the period of time during which the LED string is not lit is lengthened, there is a possibility that the luminance of the LED lighting device 400 will be reduced. Further, if the period of time during which the LED string is not lit is lengthened, there is also a possibility that a flicker and motion break, in which a moving object is seen discontinuously, will become conspicuous. One of the measures to counteract these problems is to divide the LED string into a plurality of strings to shorten the period of time of the unlit state. With reference to FIG. 7 and FIG. 8, the LED lighting device 500 in which the LED string is divided so as to shorten the period of time of the unlit state is explained.

The LED lighting device 500 has a first LED string 510*a*, a second LED string 510*b*, the current limit circuit 420, the voltage hold circuit 230, the detection circuit 240, the control circuit 250, the voltage drop circuit 270, the bridge rectifier 460, and a bypass circuit 580. The first and second LED strings 510*a* and 510*b* have a single LED 511 and a single LED 512, or a plurality of LEDs 511 connected in series and a plurality of LEDs 512 connected in series, respectively, and the LED string 210 illustrated in FIG. 6 corresponds to the divided circuit. The current limit circuit 420, the voltage hold circuit 230, the detection circuit 240, the control circuit 250, the voltage drop circuit 270, and the bridge rectifier 460 are circuits equivalent to the circuits illustrated in FIG. 6, respectively.

The bypass circuit 580 has a pull-up resistor 581, a bypass resistor 584, an FET 582, and a transistor 583. The upper terminal of the pull-up resistor 581 and the drain of the FET 582 are connected to the cathode of the first LED string 510*a* and to the anode of the second LED string 510*b*. The emitter of the transistor 583 and the lower terminal of the bypass resistor 584 are connected to the reference voltage wire. The connection part to which the source of the FET 582, the base of the transistor 583, and the upper terminal of the bypass resistor 584 are connected is connected to the emitter of the transistor 423 and to the sources of the FETs 427, 428, and 429 of the current limit circuit 420. Into this connection part, a current flows from the current limit circuit 420. The lower terminal of the pull-up resistor 581, the collector of the transistor 583, and the gate of the FET 582 are connected to one another.

The operation flow of the power source switch 201 and the lit state, such as the order of brightness of the LED lighting device 500, are the same as those of the LED lighting device 400 illustrated in FIG. 6. With reference to FIG. 8, current waveforms of the LED lighting device 500 are explained. FIG. 8(*a*) is a diagram illustrating part of the output signal of the bridge rectifier 460 and specifically, is a diagram illustrating one period of the output signal full-wave-rectified by the bridge rectifier 460. FIG. 8(*b*) is a diagram illustrating the waveform of the current I that flows when the brightness of the LED lighting device 500 becomes the highest. FIG. 8(*c*) is a diagram illustrating the waveform of the current I that flows when the brightness of the LED lighting device 500 becomes an intermediate level. FIG. 8(*d*) is a diagram illustrating the waveform of the current I that flows when the brightness of the LED lighting device 500 becomes the lowest. The horizontal axis in FIGS. 8A to 8D represents time, the vertical axis in FIG. 8(*a*) represents the voltage value, and the vertical axis in FIGS. 8B to 8D represents the current value. The time represented by the horizontal axis in FIGS. 8A to 8D is identical and the absolute value of the current value represented by the vertical axis in FIGS. 8B to 8D is identical. In the following explanation, the symbols, the terminal names, etc., in FIG. 7 are referred to.

With reference to FIG. 8(*b*), the circuit operation of the bypass circuit 580 is explained. During a period of time t1 before the output voltage of the bridge rectifier 460 reaches a threshold voltage $V_{th1}$ of the first LED string 510*a*, the current I is zero. Next, as illustrated by a period of time t2, when the output voltage of the bridge rectifier 460 reaches the threshold voltage $V_{th1}$ of the first LED string 510*a*, the current I increases rapidly. When the current I increases rapidly, feedback is applied so that the base-emitter voltage of the transistor 583 is kept at 0.6 V in the bypass circuit 580, and therefore a constant current flows during a fixed period of time t3. Next, during the last period of time of the period of time t3, the output voltage of the bridge rectifier 460 becomes greater than the total threshold voltage of the threshold voltage $V_{th1}$ of the first LED string 510*a* and a threshold voltage $V_{th2}$ of the second LED string 510*b*. During the last period of time of the period of time t3, part of the current I flows through the bypass circuit 580 via the second LED string 510*b* and the current limit circuit 420. During the last period of time of the period of time t3, the total current of the current that flows into bypass circuit 580 through the FET 582 becomes constant in the bypass circuit 580.

Next, when the output voltage of the bridge rectifier 460 increases further, the current flowing through the second LED string 510*b* increases, and therefore, during the initial period of time of a period of time t4, the gate-source voltage becomes zero or negative and the FET 582 is turned off. When the FET 582 is turned off, the current flowing via the bypass first input terminal is shut off and the current I flows via the first and second LED strings 510*a* and 510*b*. Next, as illustrated in the center part of the period of time t4, the current limit circuit 420 limits the upper limit value of the current I to the limit current value $I_{max}$. Then, the output voltage of the bridge rectifier 460 decreases. During the period of time during which the output voltage of the bridge rectifier 460 decreases, the circuit operation of the bypass circuit 580 is performed in the opposite order of that during the period of time during which the output voltage of the bridge rectifier 460 increases.

FIG. 8(*c*) is a diagram illustrating the case where the current I flows through the resistor 425 and the FET 428 and the limit current value $I_{mid}$, which is the peak at the center part of the current waveform, is smaller than the limit current value $I_{max}$ illustrated in FIG. 8(*b*). FIG. 8(*d*) is a diagram illustrating the case where the current I flows through the resistor 426 and the FET 429 and the limit current value $I_{min}$, which the peak at the center part of the current waveform, is smaller again than the limit current value $I_{mid}$ illustrated in FIG. 8(*c*). As illustrated in FIG. 8(*d*), the current value at which the bypass circuit 580 performs the constant current operation agrees with the upper limit current value limited by the current limit circuit 420.

The bypass circuit 580 operates as a current limit circuit, and therefore it may also be possible to adopt a configuration in which the bypass resistor 584 is replaced with a plurality of resistors that can be switched by a switch and light control is performed as in the current limit circuit 42.

Figure 9:
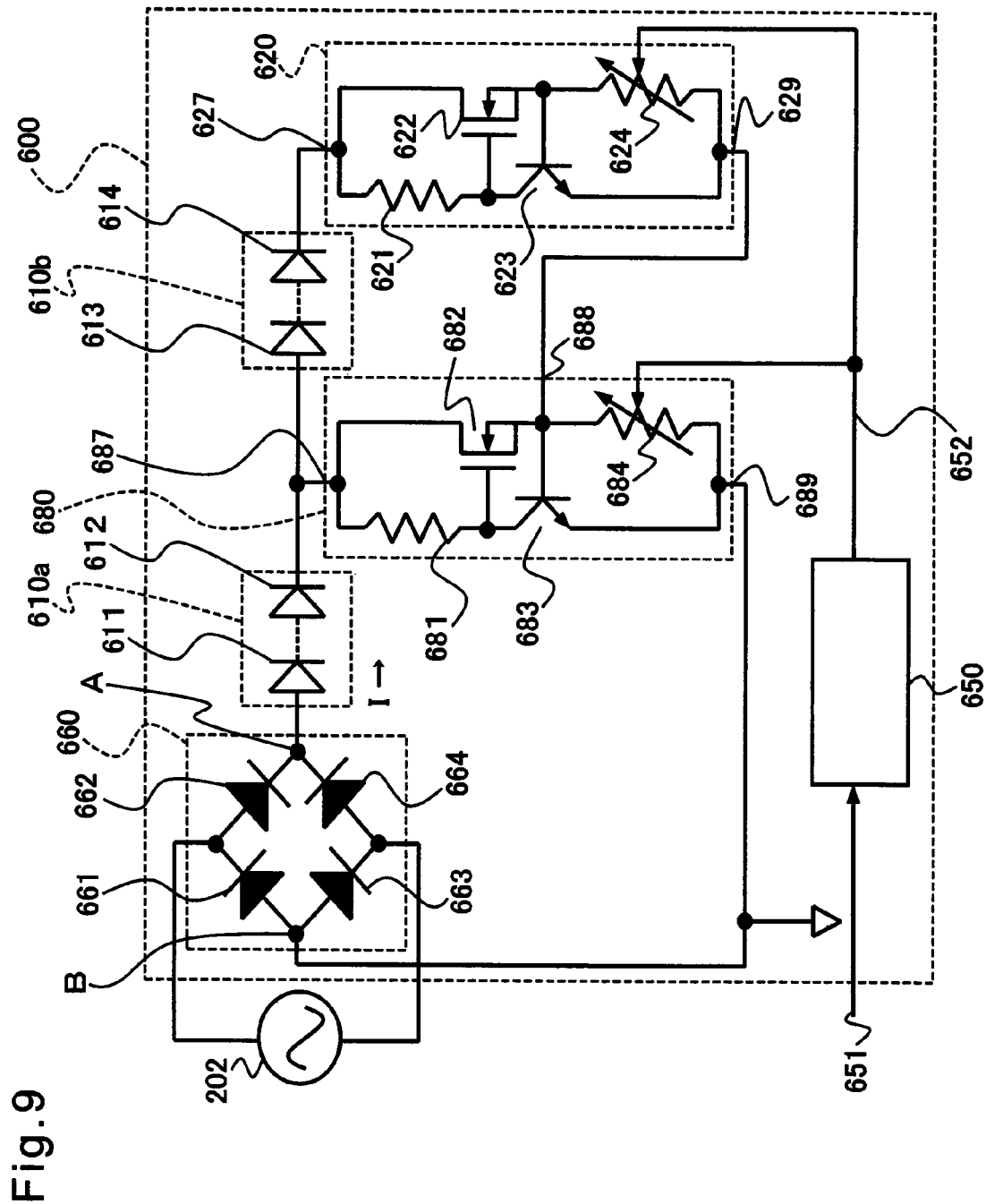
FIG. 9 is a circuit diagram illustrating another example of an LED lighting device.

With reference to FIG. 9 and FIG. 10, an LED lighting device 600 is explained. First, with reference to FIG. 9, the circuit configuration of the LED lighting device 600 is explained. FIG. 9 is a circuit diagram of the LED lighting device 600. The LED lighting device 600 has a bridge rectifier 660, a first LED string 610*a*, a second LED string 610*b*, a bypass circuit 680, a current limit circuit 620, and a control circuit 650. The alternating-current power source 202 is connected to the input terminal of the bridge rectifier 660.

The bridge rectifier 660 has four diodes 661, 662, 663, and 664. A terminal A of the bridge rectifier 660 is an output terminal from which a full-wave rectified waveform signal is output and a terminal B of the bridge rectifier 660 is connected to the reference voltage wire. The bridge rectifier 660 rectifies the voltage input from the alternating-current power source 202 and outputs an undulating voltage.

The LED string included in the LED lighting device 600 includes the first LED string 610*a* and the second LED string 610*b*. The first LED string 610*a* and the second LED string 610*b* are connected in series, and within the first LED string 610*a*, a plurality of LEDs including an LED 611 and an LED 612 are connected in series and within the second LED string 610*b*, a plurality of LEDs including an LED 613 and an LED 614 are connected in series. The anode of the LED in the initial stage of the first LED string 610*a* (hereinafter also referred to as the anode of the first LED string 610*a*) is connected to the terminal A of the bridge rectifier 660. The cathode of the LED in the final stage of the first LED string 610*a* (hereinafter also referred to as the cathode of the first LED string 610*a*) and the anode of the LED in the initial stage of the second LED string 610*b* (hereinafter also referred to as the anode of the second LED string 610*b*) are connected to a bypass first input terminal 687 of the bypass circuit 680. The cathode of the LED in the final stage of the second LED string 610*b* (hereinafter also referred to as the cathode of the second LED string 610*b*) is connected to a limit circuit input terminal 627 of the current limit circuit 620.

The bypass circuit 680 has the bypass first input terminal 687, a bypass second input terminal 688, and a bypass output terminal 689. The bypass second input terminal 688 is connected to a limit circuit output terminal 629, which is the output terminal of the current limit circuit 620. The bypass output terminal 689 is connected to the reference voltage wire together with the terminal B of the bridge rectifier 660. In the bypass circuit 680, when a current flows via the bypass second input terminal 688, the current that flows via the bypass first input terminal is shut off.

The bypass circuit 680 further has a first pull-up resistor 681, a bypass variable resistor 684, a first field effect transistor 682 (hereinafter, also referred to as a first FET), and a first bipolar transistor 683 (hereinafter, also referred to as a first transistor). The bypass first input terminal 687 is connected to one terminal of the first pull-up resistor 681 and to the drain of the first FET 682. The other terminal of the first pull-up resistor 681 is connected to the gate of the first FET 682 and to the collector of the first transistor 683. The bypass second input terminal 688 is connected to the source of the first FET 682, to the base of the first transistor 683, and to one terminal of the bypass variable resistor 684. The bypass output terminal 689 is connected to the emitter of the first transistor 683 and to the other terminal of the bypass variable resistor 684. The bypass variable resistor 684 is a variable resistor the resistance value of which changes depending on a voltage applied to the control terminal. The bypass current control terminal, which is the control terminal of the bypass variable resistor 684, is connected to the control circuit 650 via a variable resistor control voltage wire 652.

The current limit circuit 620 has substantially the same circuit configuration as that of the bypass circuit 680 and differs from the bypass circuit 680 in that there is no terminal corresponding to the bypass second input terminal of the bypass circuit 680. The wiring of a second pull-up resistor 621, a variable resistor 624, a second FET 622, and a second transistor 623 has the same configuration as the wiring inside the bypass circuit 680. The variable resistor 624 is a variable resistor the resistance value of which changes depending on the voltage applied to the control terminal similar to the bypass variable resistor 684 and the limit circuit control terminal, which is the control terminal of the variable resistor 624, is connected to the control circuit 650 via the variable resistor control voltage wire 652. The resistance value of the variable resistor 624 is smaller than the resistance value of the bypass variable resistor 684.

The first and second FETs 682 and 622 are each an enhancement type nMOS-FET.

The control circuit 650 outputs a signal for adjusting the resistance values of the bypass variable resistor 684 and the variable resistor 624 based on a control signal 651 that is input (i.e., signal applied to the variable resistor control voltage wire 652). The control circuit 650 controls the variable resistor 624 and controls currents flowing through the first and second LED strings 610*a* and 610*b*, and thus performs light control of the first and second LED strings 610*a* and 610*b*. The control signal 651 may be a digital signal compatible with DALI (Digital Addressable Lighting Interface) or an infrared signal emitted from a remote controller. In the case where the control signal 651 is a digital signal, the control circuit 650 has a photocoupler, not shown, for converting a digital signal into an reference voltage system. On the other hand, in the case where the control signal 651 is an infrared signal, the control circuit 650 has an infrared sensor, not shown. The reference voltage system of the control circuit 650 is a voltage applied to the terminal B of the bridge rectifier 660 and the control circuit 650 has a power source circuit including the step-down function, the rectifying and smoothing function, etc. Further, the control circuit 650 has a microcomputer and performs a variety of arithmetic operation processing. The voltage signal output to the variable resistor control voltage wire 652 is a signal, which is an output signal output from the microcomputer and then subjected to D/A conversion before being output.

With reference to FIG. 10, the operation of the LED lighting device 600 is explained. FIGS. 10A and 10B are each a waveform diagram of the LED lighting device 600. FIG. 10(*a*) is a diagram illustrating a full-wave rectified waveform voltage signal output from the terminal A of the bridge rectifier 660. FIG. 10(*b*) is a diagram illustrating a waveform of the current I of the LED lighting device 600 indicated by the arrow in FIG. 9. The vertical axis in FIG. 10(*a*) represents the voltage value and the vertical axis in FIG. 10(*b*) represents the current value. The time represented by the horizontal axes in FIG. 10(*a*) and FIG. 10(*b*) is identical. In the following explanation, the symbols, the terminal names, etc., in FIG. 9 are referred to.

During the period of time t1 illustrated in FIG. 10(*b*) before the output voltage of the bridge rectifier 660 reaches the threshold voltage $V_{th1}$ of the first LED string 610*a*, the current I is zero.

During the period of time t2 in FIG. 10(*b*), the output voltage of the bridge rectifier 660 exceeds the threshold voltage $V_{th1}$ of the first LED string 610*a*, but does not exceed the total threshold voltage of the threshold voltage $V_{th1}$ of the first LED string 610*a* and the threshold voltage $V_{th2}$ of the second LED string 610*b*. During the period of time t2, the circuit current I returns to the bridge rectifier 660 via the bypass circuit 680. During the period of time t2, feedback is applied so that the base-emitter voltage of the first transistor 683 is kept at 0.6 V and the bypass circuit performs the constant current operation. The circuit current I, while the bypass circuit 680 is performing the constant current operation during the period of time t2, takes the maximum value of the current flowing via the bypass first input terminal 687 of the bypass circuit 680. Next, during the last short period of time of the period of time t2, the output voltage of the bridge rectifier 660 exceeds the total threshold voltage of the threshold voltage $V_{th1}$ of the first LED string 610*a* and the threshold voltage $V_{th2}$ of the second LED string 610*b*, and a current begins to flow through the second LED string 610*b*.

Next, during the period of time t3, the output voltage of the bridge rectifier 660 becomes greater than the total threshold voltage of the threshold voltage $V_{th1}$ of the first LED string 610*a* and the threshold voltage $V_{th2}$ of the second LED string 610*b*. When the output voltage of the bridge rectifier 660 becomes greater than the total threshold voltage of the threshold voltage $V_{th1}$ of the first LED string 610*a* and the threshold voltage $V_{th2}$ of the second LED string 610*b*, the current I flows through the bypass second input terminal 688 via the second LED string 610*b* and the current limit circuit 620. When the current I flows through the bypass second input terminal 688, the gate-source voltage becomes zero or negative and the FET 682 is turned off. When the FET 682 is turned off, the circuit current I no longer flows via the bypass circuit 680 but flows via the second LED string 610*b*. The current that flows via the bypass second input terminal 688 immediately before the gate-source voltage becomes zero takes the minimum value of the current that limits or cuts off the current flowing in via the bypass first input terminal 687. This minimum value is equal to the maximum value of the current flowing via the bypass first input terminal 687 of the bypass circuit 680 described previously. In the current limit circuit 620, feedback is applied so that the base-emitter voltage of the second transistor 623 is kept at 0.6 V, whereby the circuit current I is turned into a constant current by the current limit circuit 620. The circuit current I flowing during the period of time t3 takes the maximum value of the current flowing via the current limit circuit 620.

During the period of time during which the output voltage of the bridge rectifier 660 decreases, the circuit operations of the bypass circuit 680 and the current limit circuit 620 are performed sequentially in the opposite order of those during the period of time during which the output voltage of the bridge rectifier 660 increases. Further, in the LED lighting device 600, when the period of times t2 and t3 switch, the total of the current flowing via the bypass first input terminal 687 and the current flowing via the bypass second input terminal 688 of the bypass circuit 680 becomes a fixed value. Thus, the circuit current I changes smoothly and continuously, and therefore noise is small.

In FIG. 10(*b*), C indicates the waveform of the circuit current I when adjustment is made so as to bring about the bright state, and D indicates the waveform of the circuit current I when adjustment is made so as to bring about the dark state. The bypass variable resistor 684 and the variable resistor 624 are controlled simultaneously at the same voltage, and therefore, the current waveform C and the current waveform D have similar figures. The actual dynamic range of light control is set to about 20:1 as a ratio between brightness and darkness. The brightness is in proportion to the product of the circuit current I and the number of lit LEDs (LED 611 etc.).

The circuit current I is adjusted by adjusting the resistance values of the bypass variable resistor 684 and the variable resistor 624. For example, when the resistance values of the bypass variable resistor 684 and the variable resistor 624 increase, the circuit current I decreases. In the LED lighting device 600, the control terminals of the bypass variable resistor 684 and the variable resistor 624 are connected to the single variable resistor control voltage wire 652, and therefore the same voltage is applied to the control terminals of the bypass variable resistor 684 and the variable resistor 624. However, it may also be possible to individually control the resistance values of the bypass variable resistor 684 and the variable resistor 624 by arranging a plurality of D/A converters, not shown, inside the control circuit 650 and by applying different signals to the control terminals of the bypass variable resistor 684 and the variable resistor 624.

As explained above, the number of components of the LED lighting device 600 is small, and therefore it is possible to reduce the circuit scale. Further, the same voltage is applied to the control terminals of the bypass variable resistor 684 and the variable resistor 624, and the ratio between the resistance values of the bypass variable resistor 684 and the variable resistor 624 becomes a fixed value. Thus, as indicated by the symbols C and D in FIG. 10(*b*), the current value changes in a similar manner in accordance with the change in the output voltage of the bridge rectifier 660. In this case, only the intensity of the frequency component of noise changes while maintaining the same distribution shape, and therefore measurements against noise become easy to take. The terminal voltage at the lower terminal of the bypass variable resistor 684 and the terminal voltage at the lower terminal of the variable resistor 624 do not agree in the strict sense of the word. However, this disagreement is ignored in the above explanation. Further, the current flowing via the first pull-up resistor 681 is ignored, since the amount of the current is minute compared to the current flowing via the bypass variable resistor 684 and the variable resistor 624.

FIG. 11 is a circuit diagram of an LED lighting device 700. The bypass circuit 680 and the current limit circuit 620 of the LED lighting device 600 illustrated in FIG. 9 have the enhancement type FETs 682 and 622. However, by using a depletion type FET in place of the first and second FETs 682 and 622 of enhancement type, it is possible to implement the bypass circuit and the current limit circuit having equivalent functions by a more simplified a circuit configuration. With reference to FIG. 11, the LED lighting device 700 using the depletion type FET is illustrated.

First, with reference to FIG. 11, the circuit configuration of the LED lighting device 700 is explained. The LED lighting device 700 has the bridge rectifier 660, the first LED string 610*a*, the second LED string 610*b*, a bypass circuit 780, a current limit circuit 720, and the control circuit 650. The bridge rectifier 660, the first LED string 610*a*, the second LED string 610*b*, and the control circuit 650 have the same configurations of the components of the LED lighting device 600 illustrated in FIG. 9. The alternating-current power source 202 is connected to the input terminal of the bridge rectifier 660.

The LED string of the LED lighting device 700 includes the first LED string 610a and the second LED string 610b. The anode of the first LED string 610a is connected to the terminal A of the bridge rectifier 660. The connection part between the cathode of the first LED string 610a and the anode of the second LED string 610b is connected to a bypass first input terminal 787 of the bypass circuit 780. The cathode of the second LED string 610b is connected to a limit circuit input terminal 727 of the current limit circuit 720.

The bypass circuit 780 has the bypass first input terminal 787, a bypass second input terminal 788, and a bypass output terminal 789. The bypass second input terminal 788 is connected to a limit circuit output terminal 729, which is the output terminal of the current limit circuit 720. The bypass output terminal 789 is connected to the terminal B of the bridge rectifier 660. In the bypass circuit 780, the current flowing via the bypass first input terminal 787 is limited by the current flowing via the bypass second input terminal 788.

The bypass circuit 780 has a third field effect transistor 782 (hereinafter also referred to as a third FET) and a bypass variable resistor 784. The bypass first input terminal 787 is connected to the drain of the third FET 782. The bypass second input terminal 788 is connected to the source of the third FET 782 and to one terminal of the bypass variable resistor 784. The bypass output terminal 789 is connected to the gate of the third FET 782 and to the other terminal of the bypass variable resistor 784. The bypass variable resistor 784 is a variable resistor the resistance value of which changes depending on the voltage applied to the control terminal of the bypass variable resistor 784 and the bypass current control terminal, which is the control terminal of the bypass variable resistor 784, is connected to the control circuit 650 via the variable resistor control voltage wire 652.

The current limit circuit 720 has substantially the same circuit configuration as that of the bypass circuit 780, but differs from the bypass circuit 780 in that the terminal corresponding to the bypass second input terminal 788 of the bypass circuit 780 is not provided. The wiring of each of a fourth FET 722 and a variable resistor 727 is the same as the wiring inside the bypass circuit 780. The variable resistor 724 is a variable resistor the resistance value of which changes depending on the voltage applied to the control terminal similar to the bypass variable resistor 784 and the limit circuit control terminal, which is the control terminal of the variable resistor 724, is connected to the control circuit 650 via the variable resistor control voltage wire 652. The resistance value of the variable resistor 724 is smaller than the resistance value of the bypass variable resistor 784.

The third and fourth FETs 782 and 722 are depletion type nMOS-FETs.

With reference to FIG. 10, the operation of the LED lighting device 700 is explained. FIG. 10 is the waveform diagram of the LED lighting device 600. However, the waveform in the LED lighting device 700 is also the same waveform, and therefore explanation is given with reference to FIG. 10. In the following explanation, the symbols, the terminal names, etc., in FIG. 11 are referred to.

During the period of time t1 illustrated in FIG. 10(*b*) before the output voltage of the bridge rectifier 660 reaches the threshold voltage $V_{th1}$ of the first LED string 610a, the current I is zero.

During the period of time t2 in FIG. 10(*b*), the output voltage of the bridge rectifier 660 exceeds the threshold voltage $V_{th1}$ of the first LED string 610a, but does not exceed the total threshold voltage of the threshold voltage $V_{th1}$ of the first LED string 610a and the threshold voltage $V_{th2}$ of the second LED string 610b. During the period of time t2, the circuit current I returns to the bridge rectifier 660 via the bypass circuit 780. Further, during the period of time t2, feedback is applied from the bypass variable resistor 784 to the source of the FET 782 and the bypass circuit 780 performs the constant current operation. The circuit current I while the bypass circuit 780 is performing the constant current operation during the period of time t2 takes the maximum value of the current flowing via the bypass first input terminal 787 of the bypass circuit 780. During the last short period of time of the period of time t2, the output voltage of the bridge rectifier 660 exceeds the total threshold voltage of the threshold voltage $V_{th1}$ of the first LED string 610a and the threshold voltage $V_{th2}$ of the second LED string 610b and a current begins to flow through the second LED string 610b. When a current begins to flow through the second LED string 610b, the same current as the current flowing via the bypass second input terminal 788 decreases from the current flowing through the FET 782, and therefore the circuit current I is turned into a constant current.

Next, during the period of time t3, the output voltage of the bridge rectifier 660 becomes greater than the total threshold voltage of the threshold voltage $V_{th1}$ of the first LED string 610a and the threshold voltage $V_{th2}$ of the second LED string 610b. When the output voltage of the bridge rectifier 660 becomes greater than the total threshold voltage of the threshold voltage $V_{th1}$ of the first LED string 610a and the threshold voltage $V_{th2}$ of the second LED string 610b, the current I flows through the bypass second input terminal 788 via the second LED string 610b and the current limit circuit 720. When the current I flows through the bypass second input terminal 788, the voltage at the source of FET 782 increases and the source-gate voltage decreases, and therefore the FET 782 is turned off. When the FET 782 is turned off, the circuit current I no longer flows via the bypass circuit 780 but flows via the second LED string 610b. The current flowing via the bypass second input terminal 788 immediately before the FET 782 turns off takes the minimum value of the current that limits or cuts off the current flowing in via the bypass first input terminal 787. This minimum value is equal to the maximum value of the current flowing through the bypass first input terminal 787 of the bypass circuit 780 described previously. The circuit current I is turned into a constant current by the current limit circuit 720. During the period of time during which the output voltage of the bridge rectifier 660 decreases, the circuit operations of the bypass circuit 780 and the current limit circuit 720 are performed sequentially in the opposite order of those during the period of time during which the output voltage of the bridge rectifier 660 increases. Further, in the LED lighting device 700, when the period of times t2 and t3 switch, the total of the current flowing via the bypass first input terminal 787 of the bypass circuit 780 and the current flowing via the bypass second input terminal 788 becomes a fixed value. Thus, the circuit current I changes smoothly and continuously, and therefore noise is small.

The circuit current I is adjusted by adjusting the resistance values of the bypass variable resistor 784 and the variable resistor 724. For example, when the resistance values of the bypass variable resistor 784 and the variable resistor 724 increase, the circuit current I decreases. In the LED lighting device 700, the control terminals of the bypass variable resistor 784 and the variable resistor 724 are connected to the single variable resistor control voltage wire 652, and therefore the same voltage is applied to the control terminals of the bypass variable resistor 784 and the variable resistor 724. However, it may also be possible to individually control the resistance values of the bypass variable resistor 784 and the variable resistor 724 by arranging a plurality of D/A converters, not shown, inside the control circuit 650 and by applying different voltages to the control terminals of the bypass variable resistor 784 and the variable resistor 724.

As explained above, the number of components of the LED lighting device 700 is small, and therefore it is possible to reduce the circuit scale. Further, the same voltage is applied to the control terminals of the bypass variable resistor 784 and the variable resistor 724 and the ratio between the resistance values of the bypass variable resistor 784 and the variable resistor 724 becomes a fixed value. Thus, as indicated by the symbols C and D in FIG. 10(b), the current value changes in a similar manner in accordance with the change in the output voltage of the bridge rectifier 660. In this case, only the intensity of the frequency component of noise changes while maintaining the same distribution shape, and therefore measurements against noise become easy to take. The terminal voltage at the lower terminal of the bypass variable resistor 784 and the terminal voltage at the lower terminal of the variable resistor 724 do not agree in the strict sense of the word. However, this disagreement is ignored in the above explanation. Further, it may also be possible to insert a protective resistor for preventing gate destruction by a surge between the bypass output terminal 789 and the gate of the FET 782 of the bypass circuit 780, and between the limit circuit output terminal 729 and the gate of the FET 722 of the current limit circuit 720.

In the LED lighting devices 600 and 700, the LED string includes the two LED strings, i.e. the first LED string 610a and the second LED string 610b. The bypass circuit 680 and the current limit circuit 620 of the LED lighting device 600 have the same configuration, except in that the bypass second input terminal 688 is not provided in the current limit circuit 620. The bypass circuit 780 and the current limit circuit 720 of the LED lighting device 700 have the same configuration, except in that the bypass second input terminal 788 is not provided in the current limit circuit 720. Thus, it is possible to connect the first LED string 610a and the block having the bypass circuit 680 or 780 in the form of a cascade or a ladder so as to have multiple stages. The bypass circuit 680 or 780 is connected to the connection part connecting between each of a plurality of first LED strings 610a. Further, the bypass second input terminal 688 or 788 of the bypass circuit 680 or 780 in the previous stage is connected to the bypass output terminal 689 or 789 of the bypass circuit 680 or 780 in the subsequent stage. If the multistage configuration is designed by cascade connection, it is easy to improve luminance and to achieve improvement in distortion factor. The bypass variable resistor 684 or 784 included in each block is arranged so that the size becomes smaller as the distance from the side of the bridge rectifier 660 becomes longer. The resistance values of a plurality of bypass variable resistors 684 or 784 are adjusted simultaneously by being connected to the single variable resistor control voltage wire 652.

REFERENCE SIGNS LIST 100, 200, 400, 500, 600, 700 LED lighting device
101, 201 power source switch
102 direct-current power source
110, 210 LED string
111, 211, 511, 512 LED
120, 220, 420, 620, 720 current limit circuit
121, 122, 123, 424, 425, 426 resistor
124, 125, 224, 225, 226, 427, 428, 429 FET
130, 230 voltage hold circuit
131, 231, 244, 261, 461, 661, 662, 663, 664 diode
132, 142, 232, 242 capacitor
133, 141, 143, 233, 241, 243, 271, 272, 421, 581, 584, 621, 681 resistor
140, 240 detection circuit
150, 250 control circuit
151, 251 counter
202 alternating-current power source
221, 222, 223 constant current diode
252 decoder
260 rectifier circuit
270 voltage drop circuit
422, 482, 622, 682, 722, 782 FET
423, 583, 623, 683 transistor
460, 660 bridge rectifier (rectifier)
510a, 510b, 610a, 610b LED string (first LED string and second LED string)
580, 680, 780 bypass circuit
624, 684, 724, 784 variable resistor
650 control circuit
t1 to t4 period of time

What is claimed is:
1. An LED lighting device comprising:
an LED string including a first LED string and a second LED string connected in series;
a rectifier to which an alternating-current power source is input and which outputs an undulating voltage to the LED string;
a current limit circuit connected in series to the LED string, and having a variable resistor element and a current limit transistor connected with the variable resistor element in series;
a bypass circuit having a bypass first input terminal connected between the first LED string and the second LED string, a bypass current control terminal, a bypass variable resistor element and a bypass transistor connected with the bypass variable resistor element in series; and
a control circuit configured to control a current flowing through the LED string by controlling the resistor element, thereby to perform light control of the LED string;
wherein the bypass circuit causes a constant current to flow via the bypass first input terminal in a case where the undulating voltage output from the rectifier is between a threshold voltage of the first LED string and a total threshold voltage of the threshold voltages of the first and second LED strings, and shuts off the current via the bypass first input terminal in a case where the undulating voltage exceeds the total threshold voltage, and
the control circuit inputs a bypass current control signal for controlling a current value of the constant current flowing via the bypass first input terminal by controlling the bypass variable resistor element to the bypass current control terminal.
2. The LED lighting device according to claim 1, wherein the current limit circuit further has a limit circuit input terminal connected to the second LED string and a limit circuit control terminal, the current limit circuit causes a constant current to flow via the limit circuit input terminal in a case where the undulating voltage exceeds the total threshold voltage, and the control circuit inputs a limit circuit control signal for controlling a current value of the constant current flowing via the limit circuit input terminal by controlling the variable resistor element to the limit circuit control terminal.
3. The LED lighting device according to claim 2, wherein the bypass current control signal and the limit circuit control signal are the same signal.
4. The LED lighting device according to claim 2, wherein the bypass circuit further has a first bipolar transistor, a first pull-up resistor, a bypass second input terminal con- nected to a limit circuit output terminal, which is an output terminal of the current limit circuit, and a bypass output terminal, the bypass transistor is a first field effect transistor of enhancement type, the bypass first input terminal is connected to one terminal of the first pull-up resistor and to the drain of the first field effect transistor, the other terminal of the first pull-up resistor is connected to the gate of the first field effect transistor and to the collector of the first bipolar transistor, the bypass second input terminal is connected to the source of the first field effect transistor, to the base of the first bipolar transistor, and to one terminal of the bypass variable resistor element, and the bypass output terminal is connected to the emitter of the first bipolar transistor and to the other terminal of the bypass variable resistor element.

5. The LED lighting device according to claim 4, wherein the current limit circuit further has a second bipolar transistor, a second pull-up resistor, and a limit circuit input terminal, the current limit transistor is a second field effect transistor of enhancement type, the limit circuit input terminal is connected to one terminal of the second pull-up resistor and to the drain of the second field effect transistor, the other terminal of the second pull-up resistor is connected to the gate of the second field effect transistor and to the collector of the bipolar transistor, the source of the field effect transistor is connected to the base of the bipolar transistor and to one terminal of the bypass variable resistor element, and the limit circuit output terminal is connected to the emitter of the second bipolar transistor and to the other terminal of the bypass variable resistor element.

6. The LED lighting device according to claim 2, wherein the bypass circuit further has a bypass second input terminal connected to a limit circuit output terminal, which is an output terminal of the current limit circuit, and a bypass output terminal, the bypass transistor is a third field effect transistor of depletion type, the bypass first input terminal is connected to the drain of the third field effect transistor, the bypass second input terminal is connected to the source of the third field effect transistor and to one terminal of the bypass variable resistor element, and the bypass output terminal is connected to the gate of the third field effect transistor and to the other terminal of the bypass variable resistor element.

7. The LED lighting device according to claim 6, wherein the current limit transistor is a forth field effect transistor of depletion type, the limit circuit input terminal is connected to the drain of the fourth field effect transistor, the source of the fourth field effect transistor is connected to one terminal of the variable resistor element, and the limit circuit output terminal is connected to the gate of the fourth field effect transistor and to the other terminal of the variable resistor element.

8. An LED lighting device comprising:

an LED string including a first LED string and a second LED string connected in series;

a rectifier to which an alternating-current power source is input and which outputs an undulating voltage to the LED string;

a current limit circuit connected in series to the LED string, and having a variable resistor element, a limit circuit input terminal connected to the second LED string and a limit circuit control terminal;

a bypass circuit having a bypass first input terminal connected between the first LED string and the second LED string, a bypass second input terminal connected to a limit circuit output terminal, which is an output terminal of the current limit circuit, a bypass current control terminal, a bypass output terminal, a bypass variable resistor element and a bypass transistor, wherein the bypass transistor is a first field effect transistor; and a control circuit configured to control a current flowing through the LED string by controlling the variable resistor element, thereby to perform light control of the LED string; wherein the bypass circuit causes a constant current to flow via the bypass first input terminal in a case where the undulating voltage output from the rectifier is between a threshold voltage of the first LED string and a total threshold voltage of the threshold voltages of the first and second LED strings, and shuts off the current via the bypass first input terminal in a case where the undulating voltage exceeds the total threshold voltage, and the current limit circuit causes a constant current to flow via the limit circuit input terminal in a case where the undulating voltage exceeds the total threshold voltage, the control circuit inputs a bypass current control signal for controlling a current value of a constant current flowing via the bypass first input terminal by controlling the bypass variable resistor element to the bypass current control terminal, and inputs a limit circuit control signal for controlling a current value of a constant current flowing via the limit circuit input terminal by controlling the variable resistor element to the limit circuit control terminal, the bypass first input terminal is connected to the drain of the bypass transistor, the bypass second input terminal is connected to the source of the bypass transistor, and to one terminal of the bypass variable resistor element, and the bypass output terminal is connected to the other terminal of the bypass variable resistor element.

9. The LED lighting device according to claim 8, wherein the bypass circuit further has a first bipolar transistor, and a first pull-up resistor, the bypass transistor is a first field effect transistor of enhancement type, the bypass first input terminal is further connected to one terminal of the first pull-up resistor and to the drain of the first field effect transistor, the other terminal of the first pull-up resistor is connected to the gate of the first field effect transistor and to the collector of the first bipolar transistor, the bypass second input terminal is further connected to the base of the first bipolar transistor, and the bypass output terminal is further connected to the emitter of the first bipolar transistor.

10. The LED lighting device according to claim 9, wherein the current limit circuit further has a second bipolar transistor, a second field effect transistor of enhancement type, a second pull-up resistor, and a limit circuit input terminal, the limit circuit input terminal is connected to one terminal of the second pull-up resistor and to the drain of the second field effect transistor, the other terminal of the second pull-up resistor is connected to the gate of the second field effect transistor and to the collector of the bipolar transistor, the source of the field effect transistor is connected to the base of the bipolar transistor and to one terminal of the bypass variable resistor element, and the limit circuit output terminal is connected to the emitter of the second bipolar transistor and to the other terminal of the bypass variable resistor element.

11. The LED lighting device according to claim 8, wherein the bypass transistor is a third field effect transistor of depletion type, the bypass first input terminal is connected to the drain of the third field effect transistor, the bypass second input terminal is connected to the source of the third field effect transistor and to one terminal of the bypass variable resistor element, and the bypass output terminal is connected to the gate of the third field effect transistor and to the other terminal of the bypass variable resistor element.

12. The LED lighting device according to claim 11, wherein the current limit circuit further has a fourth field effect transistor of depletion type, the limit circuit input terminal is connected to the drain of the fourth field effect transistor, the source of the fourth field effect transistor is connected to one terminal of the variable resistor element, and the limit circuit output terminal is connected to the gate of the fourth field effect transistor and to the other terminal of the variable resistor element.

\* \* \* \* \*